US012511864B2

(12) United States Patent
Paden

(10) Patent No.: US 12,511,864 B2
(45) Date of Patent: Dec. 30, 2025

(54) ASSOCIATION OF CONCURRENT TRACKS USING GRAPH CROSSINGS

(71) Applicant: Summer Robotics, Inc., Campbell, CA (US)

(72) Inventor: Brian Alexander Paden, Scotts Valley, CA (US)

(73) Assignee: Summer Robotics, Inc., Campbell, CA (US)

( * ) Notice: Subject to any disclaimer, the term of this patent is extended or adjusted under 35 U.S.C. 154(b) by 427 days.

(21) Appl. No.: 18/113,283

(22) Filed: Feb. 23, 2023

(65) Prior Publication Data

US 2023/0274523 A1 Aug. 31, 2023

Related U.S. Application Data

(60) Provisional application No. 63/268,610, filed on Feb. 27, 2022.

(51) Int. Cl.
*G06V 10/42* (2022.01)
*G06T 7/73* (2017.01)

(52) U.S. Cl.
CPC .............. *G06V 10/421* (2022.01); *G06T 7/73* (2017.01); *G06V 2201/07* (2022.01)

(58) Field of Classification Search
CPC .... G06V 10/421; G06V 2201/07; G06T 7/73; G06T 2207/10048; G06T 7/593;
(Continued)

(56) References Cited

U.S. PATENT DOCUMENTS

| 5,349,916 A | 9/1994 | Hillenbrand et al. |
| 5,729,475 A | 3/1998 | Romanik, Jr. |

(Continued)

FOREIGN PATENT DOCUMENTS

| CN | 102928431 A | 2/2013 |
| CN | 109458928 A | 3/2019 |

(Continued)

OTHER PUBLICATIONS

Office Communication for U.S. Appl. No. 18/121,486 mailed Aug. 16, 2023, pp. 1-2.
(Continued)

*Primary Examiner* — Jerome Grant, II
(74) *Attorney, Agent, or Firm* — John W. Branch; Branch Partners PLLC

(57) ABSTRACT

Embodiments are directed to the association of concurrent tracks using graph crossings. Signal beams may be employed to scan paths across an object such that sensors separately detect signals from the signal beams reflected by the object. Crossing points may be determined based on a plurality of trajectories that intersect each other during the scan of the object. Graphs may be generated based on the portion of trajectories and the crossing points such that each edge in the graphs corresponds to a crossing point and such that each node in the one or more graphs corresponds to a trajectory. The graphs may be compared to determine one or more matched graphs that may share a common topology. Common trajectories may be determined based on the matched graphs such that each common trajectory may be associated with a same path across the object and a separate sensor.

28 Claims, 13 Drawing Sheets

(58) Field of Classification Search
CPC . G06T 2207/10021; G06T 2207/10024; G06T 2207/20072
USPC ......................................................... 382/103
See application file for complete search history.

(56) References Cited

U.S. PATENT DOCUMENTS

| | | | |
|---|---|---|---|
| 6,748,112 | B1 | 6/2004 | Nguyen et al. |
| 7,198,195 | B2 | 4/2007 | Bobba et al. |
| 8,047,149 | B1 | 11/2011 | Antonelli et al. |
| 8,353,457 | B2 | 1/2013 | Olmstead |
| 9,117,267 | B2 | 8/2015 | Francis, Jr. et al. |
| 9,489,735 | B1 | 11/2016 | Reitmayr |
| 10,213,645 | B1 | 2/2019 | Wu et al. |
| 11,703,315 | B2 * | 7/2023 | Dapore .............. G01B 9/02015 356/450 |
| 11,704,835 | B2 | 7/2023 | Cullen et al. |
| 11,785,200 | B1 | 10/2023 | Smits et al. |
| 11,808,857 | B2 | 11/2023 | Cullen et al. |
| 11,887,340 | B2 | 1/2024 | Cullen et al. |
| 11,974,055 | B1 | 4/2024 | Smits et al. |
| 12,111,180 | B2 | 10/2024 | Paden |
| 12,148,185 | B2 | 11/2024 | Cullen et al. |
| 12,262,127 | B2 | 3/2025 | Smits et al. |
| 12,276,730 | B2 | 4/2025 | Smits et al. |
| 12,401,905 | B2 | 8/2025 | Smits et al. |
| 12,416,804 | B1 | 9/2025 | Smits et al. |
| 2002/0008791 | A1 | 1/2002 | Okamori et al. |
| 2007/0090180 | A1 | 4/2007 | Griffis et al. |
| 2008/0012850 | A1 | 1/2008 | Keating, III |
| 2008/0165360 | A1 | 7/2008 | Johnston |
| 2008/0201101 | A1 | 8/2008 | Hebert et al. |
| 2009/0087029 | A1 | 4/2009 | Coleman et al. |
| 2009/0096994 | A1 | 4/2009 | Smits |
| 2011/0122233 | A1 | 5/2011 | Kasai et al. |
| 2011/0273442 | A1 | 11/2011 | Drost et al. |
| 2014/0105506 | A1 | 4/2014 | Drost et al. |
| 2014/0368614 | A1 | 12/2014 | Imai et al. |
| 2015/0378023 | A1 | 12/2015 | Royo Royo et al. |
| 2016/0096477 | A1 | 4/2016 | Biemer |
| 2016/0180574 | A1 | 6/2016 | Kaminitz et al. |
| 2016/0259168 | A1 | 9/2016 | Katz et al. |
| 2017/0035281 | A1 | 2/2017 | Takeuchi et al. |
| 2017/0068861 | A1 | 3/2017 | Miller et al. |
| 2017/0142393 | A1 | 5/2017 | Oggier |
| 2017/0176575 | A1 | 6/2017 | Smits |
| 2017/0195589 | A1 | 7/2017 | Kovacovsky et al. |
| 2018/0180733 | A1 | 6/2018 | Smits |
| 2019/0072770 | A1 | 3/2019 | Hall |
| 2019/0128665 | A1 | 5/2019 | Harendt |
| 2019/0213309 | A1 | 7/2019 | Morestin et al. |
| 2019/0235081 | A1 | 8/2019 | Smits |
| 2019/0258869 | A1 | 8/2019 | Stelzer et al. |
| 2019/0279379 | A1 | 9/2019 | Srinivasan et al. |
| 2019/0310351 | A1 | 10/2019 | Hughes et al. |
| 2020/0075658 | A1 | 3/2020 | Kato et al. |
| 2020/0142073 | A1 | 5/2020 | Gassend et al. |
| 2020/0160012 | A1 | 5/2020 | Nunnink et al. |
| 2020/0264414 | A1 | 8/2020 | Svec |
| 2020/0280664 | A1 | 9/2020 | Lee et al. |
| 2021/0023714 | A1 | 1/2021 | Zhang et al. |
| 2021/0037229 | A1 | 2/2021 | Maykol et al. |
| 2021/0080548 | A1 | 3/2021 | Beuschel et al. |
| 2021/0141094 | A1 | 5/2021 | Russ et al. |
| 2021/0261159 | A1 | 8/2021 | Pazhayampallil et al. |
| 2021/0278539 | A1 | 9/2021 | Laddha et al. |
| 2021/0304574 | A1 | 9/2021 | Ramanathan et al. |
| 2022/0156998 | A1 | 5/2022 | Lee et al. |
| 2022/0187461 | A1 | 6/2022 | Cullen |
| 2022/0222845 | A1 | 7/2022 | Inada |
| 2022/0287676 | A1 | 9/2022 | Steines et al. |
| 2023/0003549 | A1 | 1/2023 | Paden |
| 2023/0015889 | A1 | 1/2023 | Cullen et al. |
| 2023/0034733 | A1 | 2/2023 | Cullen et al. |
| 2023/0060421 | A1 | 3/2023 | Cullen et al. |
| 2023/0169683 | A1 | 6/2023 | Paden et al. |
| 2023/0230212 | A1 | 7/2023 | García et al. |
| 2023/0316657 | A1 | 10/2023 | Smits et al. |
| 2023/0360268 | A1 | 11/2023 | Cullen et al. |
| 2024/0022819 | A1 | 1/2024 | Smits et al. |
| 2024/0040274 | A1 | 2/2024 | Smits et al. |
| 2024/0114235 | A1 | 4/2024 | Gallagher et al. |
| 2024/0129645 | A1 | 4/2024 | Smits et al. |
| 2024/0329248 | A1 | 10/2024 | Smits et al. |
| 2025/0027765 | A1 | 1/2025 | Paden |
| 2025/0056133 | A1 | 2/2025 | Smits et al. |
| 2025/0277901 | A1 | 9/2025 | Smits et al. |
| 2025/0321337 | A1 | 10/2025 | Smits et al. |

FOREIGN PATENT DOCUMENTS

| | | | | |
|---|---|---|---|---|
| CN | 112365585 | A | 2/2021 | |
| CN | 112750168 | A | 5/2021 | |
| CN | 113313710 | A | 8/2021 | |
| CN | 155115760 | * | 9/2022 | ............ G06T 15/06 |
| CN | 116829902 | A | 9/2023 | |
| EP | 4260006 | A1 | 6/2022 | |
| JP | H06-94428 | A | 4/1994 | |
| JP | H11-64229 | A | 3/1999 | |
| JP | 2000-231344 | A | 8/2000 | |
| JP | 2009-243986 | A | 10/2009 | |
| JP | 2018-195240 | A | 12/2018 | |
| JP | 2020-52719 | A | 4/2020 | |
| JP | 2020-64011 | A | 4/2020 | |
| JP | 2020-514713 | A | 5/2020 | |
| JP | 2020-106475 | A | 7/2020 | |
| JP | 2021-167776 | A | 10/2021 | |
| JP | 2024-501078 | A | 1/2024 | |
| KR | 10-2021-0075563 | A | 6/2021 | |
| WO | 2013/093459 | A2 | 6/2013 | |
| WO | 2014/060564 | A1 | 4/2014 | |
| WO | 2018000037 | A1 | 1/2018 | |
| WO | 2018125850 | A1 | 7/2018 | |
| WO | 2019189381 | A1 | 10/2019 | |
| WO | 2020/061214 | A1 | 3/2020 | |
| WO | 2020080237 | A1 | 4/2020 | |
| WO | 2021039022 | A1 | 3/2021 | |
| WO | 2021140886 | A1 | 7/2021 | |
| WO | 2022132828 | A1 | 6/2022 | |
| WO | 2023/278868 | A1 | 1/2023 | |
| WO | 2023/288067 | A1 | 1/2023 | |
| WO | 2023/009755 | A1 | 2/2023 | |
| WO | 2023/028226 | A1 | 3/2023 | |
| WO | 2023/096873 | A1 | 6/2023 | |
| WO | 2023/164064 | A1 | 8/2023 | |
| WO | 2023/177692 | A1 | 9/2023 | |
| WO | 2023/196225 | A1 | 10/2023 | |
| WO | 2024/025865 | A1 | 2/2024 | |

OTHER PUBLICATIONS

International Preliminary Report on Patentability for International Patent Application No. PCT/US2021/063399 mailed Jun. 29, 2023, pp. 1-5.

International Search Report and Written Opinion for International Patent Application No. PCT/US2023/017271 mailed Jul. 11, 2023, pp. 1-7.

Office Communication for U.S. Appl. No. 18/121,486 mailed Aug. 3, 2023, pp. 1-10.

Office Communication for U.S. Appl. No. 17/865,794 mailed Aug. 21, 2024, 12 Pages.

International Preliminary Report on Patentability for International Patent Application No. PCT/US2023/015227 mailed Sep. 26, 2024, 5 Pages.

Office Communication for U.S. Appl. No. 18/504,052 mailed Aug. 22, 2024, 7 Pages.

International Preliminary Report on Patentability for International Patent Application No. PCT/US2023/013718 mailed Sep. 6, 2024, 5 Pages.

International Preliminary Report on Patentability for International Patent Application No. PCT/US2023/017271 mailed Oct. 17, 2024, 5 Pages.

(56) References Cited

OTHER PUBLICATIONS

Office Communication for U.S. Appl. No. 18/618,909 mailed Nov. 20, 2024, 9 Pages.
Extended European Search Report for European Patent Application No. 21907668.4 mailed on Dec. 6, 2024, 10 pages.
Office Communication for U.S. Appl. No. 18/221,816 mailed Dec. 6, 2024, 27 Pages.
Office Communication for U.S. Appl. No. 18/504,052 mailed Dec. 9, 2024, 6 Pages.
International Preliminary Report on Patentability for International Patent Application No. PCT/US2023/028551 mailed Feb. 6, 2025, 07 Pages.
Office Communication for U.S. Appl. No. 18/221,816 mailed May 14, 2025, 9 Pages.
International Search Report and Written Opinion for International Patent Application No. PCT/US2022/050626 mailed Mar. 7, 2023, pp. 1-8.
Office Communication for U.S. Appl. No. 17/895,489 mailed Apr. 11, 2023, pp. 1-36.
Office Communication for U.S. Appl. No. 18/130,080 mailed Jun. 20, 2023, pp. 1-36.
Office Communication for U.S. Appl. No. 17/895,489 mailed Jul. 5, 2023, pp. 1-13.
International Search Report and Written Opinion for International Patent Application No. PCT/US2023/015227 mailed Jun. 27, 2023, pp. 1-7.
International Search Report and Written Opinion for International Patent Application No. PCT/US2023/013718 mailed May 30, 2023, pp. 1-7.
International Search Report and Written Opinion for International Patent Application No. PCT/US2023/028551 mailed Oct. 24, 2023, 09 Pages.
Office Communication for U.S. Appl. No. 17/551,054 mailed Jul. 16, 2024, 12 Pages.
Office Communication for U.S. Appl. No. 17/856,690 mailed Jul. 10, 2024, 11 Pages.
Office Communication for U.S. Appl. No. 17/856,690 mailed Jul. 24, 2024, 4 Pages.
International Preliminary Report on Patentability for International Patent Application No. PCT/US2022/036006 mailed Jan. 11, 2024, 6 Pages.
International Preliminary Report on Patentability for International Patent Application No. PCT/US2022/037299 mailed Jan. 25, 2024, 5 Pages.
International Preliminary Report on Patentability for International Patent Application No. PCT/US2022/038724 mailed Feb. 8, 2024, 5 Pages.
International Preliminary Report on Patentability for International Patent Application No. PCT/US2022/041520 mailed Mar. 7, 2024, 5 Pages.
International Preliminary Report on Patentability for International Patent Application No. PCT/US2022/050626 mailed Jun. 6, 2024, 6 Pages.
Office Communication for U.S. Appl. No. 18/488,123 mailed Jan. 2, 2024, 10 Pages.
Office Communication for U.S. Appl. No. 18/222,780 mailed Sep. 15, 2023, 10 Pages.
Office Communication for U.S. Appl. No. 18/225,833 mailed Sep. 15, 2023, 19 Pages.
Office Communication for U.S. Appl. No. 18/130,080 mailed Sep. 28, 2023, 43 Pages.
International Search Report and Written Opinion for International Patent Application No. PCT/US2021/063399 mailed Mar. 22, 2022, pp. 1-7.
International Search Report and Written Opinion for International Patent Application No. PCT/US2022/036006 mailed Oct. 4, 2022, pp. 1-8.
International Search Report and Written Opinion for International Patent Application No. PCT/US2022/037299 mailed Oct. 25, 2022, pp. 1-7.
International Search Report and Written Opinion for International Patent Application No. PCT/US2022/038724 mailed Nov. 1, 2022, pp. 1-7.
International Search Report and Written Opinion for International Patent Application No. PCT/US2022/041520 mailed Nov. 8, 2022, pp. 1-7.
Office Communication for U.S. Appl. No. 17/876,333 mailed Feb. 21, 2023, pp. 1-22.
Office Communication for U.S. Appl. No. 17/876,333 mailed Mar. 1, 2023, pp. 1-2.
Office Communication for U.S. Appl. No. 17/551,054 mailed May 27, 2025, 26 Pages.
Extended European Search Report for European Patent Application No. 22862080.3 mailed Jun. 16, 2025, 6 Pages.
Li et al., "Enhancing 3-D LiDAR Point Clouds With Event-Based Camera", IEEE Transactions on Instrumentation and Measurement, vol. 70, 9511712, 2021, 12 pages.
Gehriu et al, "DSEC: A Stereo Event Camera Dataset for Driving Scenarios", IEEE Robotics and Automation Letters, Preprint Version, Accepted Feb. 2021, 8 pages.
Office Communication for U.S. Appl. No. 19/203,054 mailed Jul. 7, 2025, 10 Pages.
Office Communication for U.S. Appl. No. 17/551,054 mailed Aug. 4, 2025, 3 Pages.
Office Communication for JP Patent Application No. 2023-560251 mailed Sep. 1, 2025, 7 Pages including English Translation.
Office Communication for U.S. Appl. No. 19/035,554 mailed Aug. 7, 2025, 8 Pages.
Office Communication for U.S. Appl. No. 19/242,542 mailed Aug. 6, 2025, 8 Pages.
Office Communication for U.S. Appl. No. 19/242,542 mailed Aug. 26, 2025, 10 Pages.
Office Communication for U.S. Appl. No. 19/059,517 mailed Aug. 12, 2025, 23 Pages.
Liu et al., "Automatic fishing net detection and recognition based on optical gated viewing for underwater obstacle avoidance," Optical Engineering, vol. 56 No. 8, Aug. 2017, pp. 083101-1-083101-7.
Russell et al., "Underwater spectral reflectance measurements: the reflectance standard submersion factor and its impact on derived target reflectance," Applied Optics, vol. 62, No. 24, Aug. 20, 2023, pp. 6299-6306.
Weng et al., "Scalable laser-based underwater wireless optical communication solution between autonomous underwater vehicle fleets," Applied Optics, vol. 62, No. 31, Nov. 2023, pp. 8261-8271.
International Search Report and Written Opinion for International Patent Application No. PCT/US2025/034271 mailed Sep. 9, 2025, 9 Pages.
Ahn et al., "Kaleidoscopic structured light", ACM Transactions on Graphics, vol. 40, Issue 6, No. 214, Dec. 2021, pp. 1-15.
Office Communication for U.S. Appl. No. 17/551,054 mailed Oct. 22, 2025, 8 Pages.

* cited by examiner

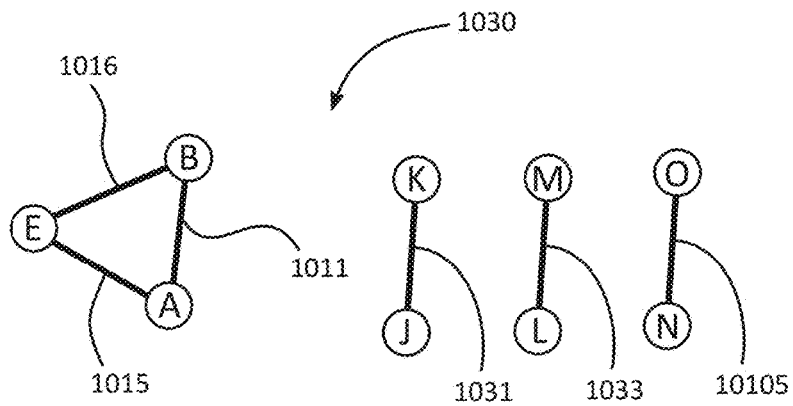
FIG. 10D
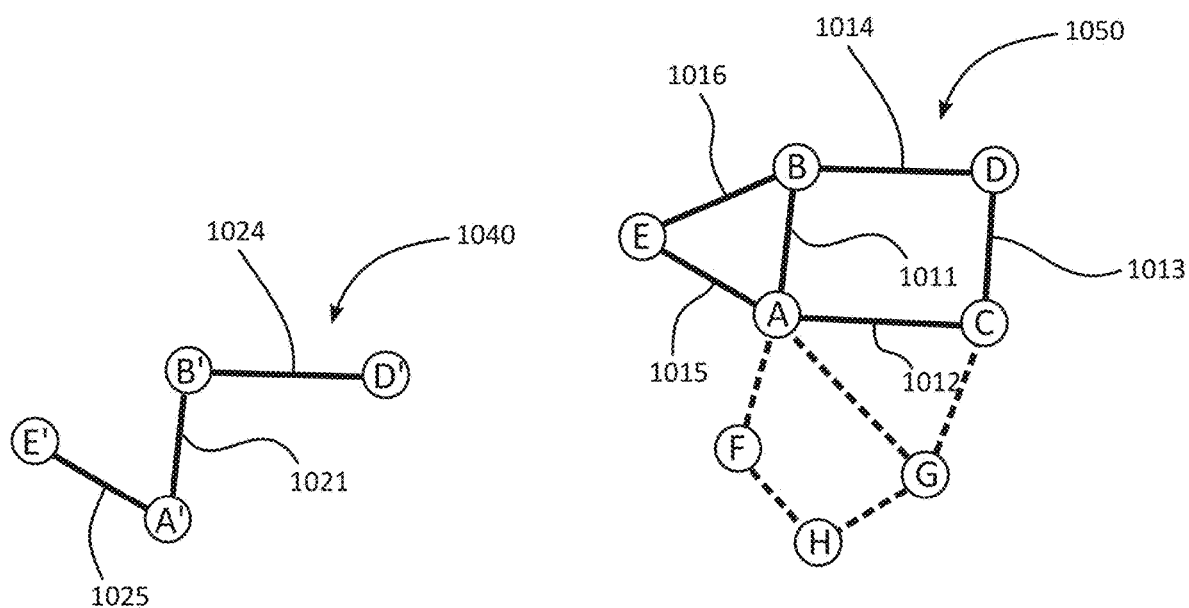
FIG. 10E
FIG. 10F

ASSOCIATION OF CONCURRENT TRACKS USING GRAPH CROSSINGS

CROSS-REFERENCE TO RELATED APPLICATION

This application is a Utility patent application based on previously filed U.S. Provisional Patent Application U.S. Ser. No. 63/268,610 filed on Feb. 27, 2022, the benefit of the filing date of which is hereby claimed under 35 U.S.C. § 119(e), and the contents of which is further incorporated in entirety by reference.

TECHNICAL FIELD

The present invention relates generally to machine sensing or machine vision systems, and more particularly, but not exclusively, to association of concurrent tracks using graph crossings.

BACKGROUND

The state of the art in robotic vision is largely based on cameras where the input to the sensing system is two-dimensional (2D) arrays of pixels that encode the amount of light that each pixel received over an exposure period, or on depth capture technologies (e.g., Time-of-Flight (ToF) cameras, structured light cameras, LIDAR, RADAR, or stereo cameras, to name a few) which provide three-dimensional (3D) point clouds, where each point in the point cloud may store its position in space with respect to the vision system, and may store any of a number of other data associated with the patch of reflecting material that the point was generated from (e.g., brightness, color, relative radial velocity, spectral composition, to name a few). Note that 3D point clouds may be represented in "frames", similar in spirit to the frames of images from cameras, meaning that they don't have a fundamental representation of continuously evolving time.

To provide useful perception output that may be used by machine vision applications, such as, robotic planning and control systems, these 2D or 3D data often need to be processed by machine vision algorithms implemented in software or hardware. In some cases, some machine vision systems may employ machine learning to determine properties or features of the world that may be salient to particular robotic tasks, such as, the location, shape orientation, material properties, object classification, object motion, relative motion of the robotic system, or the like. In many cases, neither the 2D nor 3D representations employed by conventional machine vision systems provide inherent/native support for continuous surface representation of objects in the environment.

In some cases, scanning systems may employ multiple scanning sensors (e.g., image cameras, event cameras, or the like) to concurrently scan the same scenes or objects. In some cases, each sensor may independently collect scanning information based on the particular viewpoint of the sensor. Often it may be difficult for machine vision applications to efficiently or effectively determine if scanning information from different sensors represent the same points or objects in the scanned subject matter. Thus, it is with respect to these considerations and others that the present invention has been made.

BRIEF DESCRIPTION OF THE DRAWINGS

Non-limiting and non-exhaustive embodiments of the present innovations are described with reference to the following drawings. In the drawings, like reference numerals refer to like parts throughout the various figures unless otherwise specified. For a better understanding of the described innovations, reference will be made to the following Detailed Description of Various Embodiments, which is to be read in association with the accompanying drawings, wherein:

FIG. 10D shows a larger graph set that includes a subgraph in accordance with one or more of the various embodiments;

FIG. 10E shows an example of how connection graphs may be otherwise the same as another connection graphs but with one or more missing nodes and associated crossing point lines in accordance with one or more of the various embodiments; and FIG. 10F shows an example of a connection graph having additional nodes added with crossing point connections to nodes in accordance with one or more of the various embodiments.

DETAILED DESCRIPTION OF VARIOUS EMBODIMENTS

Figure 1:
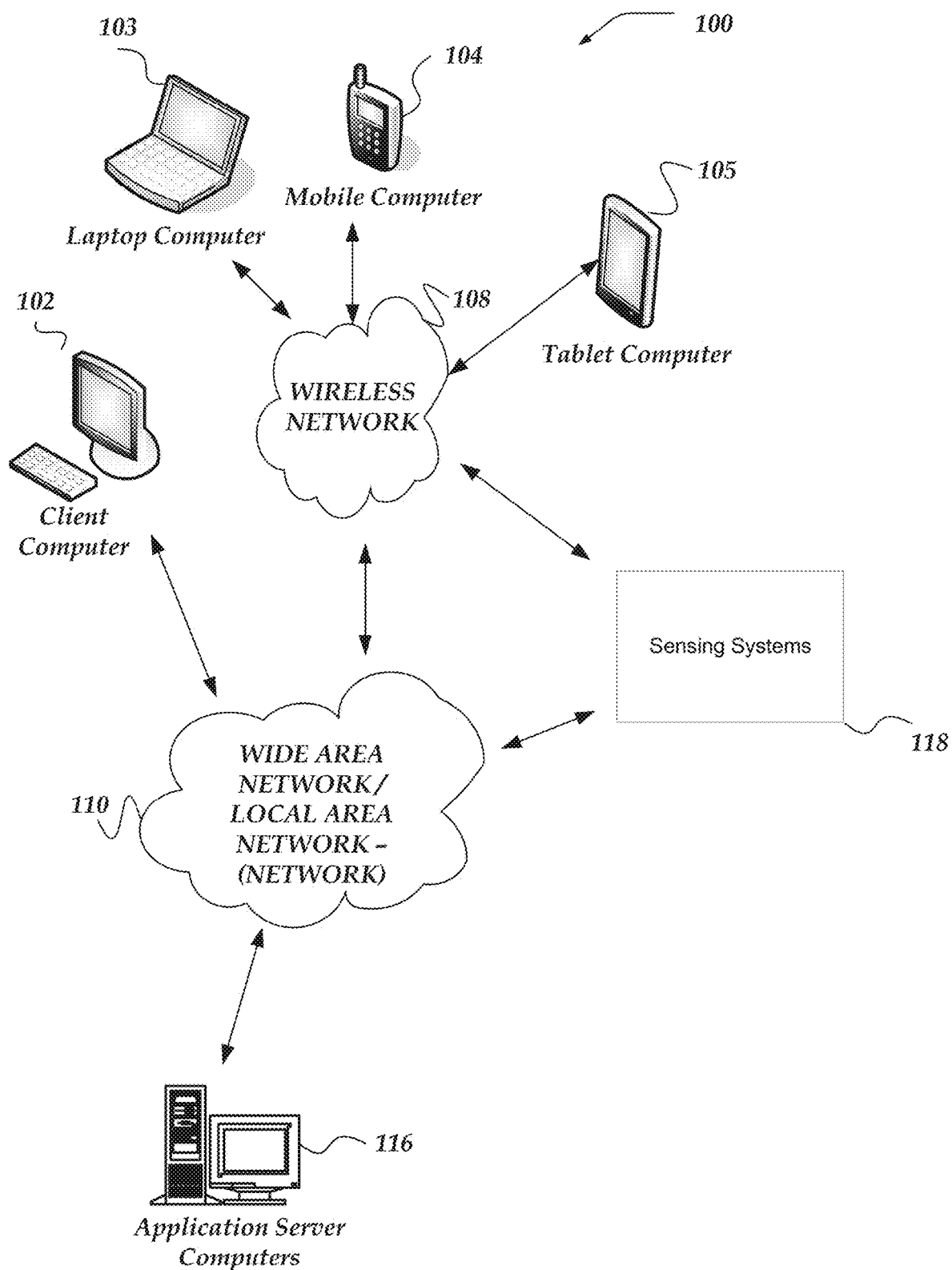
FIG. 1 illustrates a system environment in which various embodiments may be implemented.

Various embodiments now will be described more fully hereinafter with reference to the accompanying drawings, which form a part hereof, and which show, by way of illustration, specific exemplary embodiments by which the invention may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media or devices. Accordingly, the various embodiments may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

For example, embodiments, the following terms are also used herein according to the corresponding meaning, unless the context clearly dictates otherwise.

As used herein the term, "engine" refers to logic embodied in hardware or software instructions, which can be written in a programming language, such as C, C++, Objective-C, COBOL, Java™, PHP, Perl, JavaScript, Ruby, VBScript, Microsoft .NET™ languages such as C #, or the like. An engine may be compiled into executable programs or written in interpreted programming languages. Software engines may be callable from other engines or from themselves. Engines described herein refer to one or more logical modules that can be merged with other engines or applications, or can be divided into sub-engines. The engines can be stored in non-transitory computer-readable medium or computer storage device and be stored on and executed by one or more general purpose computers, thus creating a special purpose computer configured to provide the engine.

As used herein the terms "scanning signal generator," or "signal generator" refer to a system or a device that may produce a beam that may be scanned/directed to project into an environment. For example, scanning signal generators may be fast laser-based scanning devices based on dual axis microelectromechanical systems (MEMS) that are arranged to scan a laser in a defined area of interest. The characteristics of scanning signal generator may vary depending on the application or service environment. Scanning signal generators are not strictly limited to lasers or laser MEMS, other types of beam signal generators may be employed depending on the circumstances. Critical selection criteria for scanning signal generator characteristics may include beam width, beam dispersion, beam energy, wavelength(s), phase, or the like. Scanning signal generator may be selected such that they enable sufficiently precise energy reflections from scanned surfaces or scanned objects in the scanning environment of interest. The scanning signal generators may be designed to scan various frequencies, including up to 10 s of kHz. The scanning signal generators may be controlled in a closed loop fashion with one or more processors that may provide feedback about objects in the environment and instructs the scanning signal generator to modify its amplitudes, frequencies, phase, or the like.

As used herein, the terms "event sensor, or" "event camera" refers to a device or system that detects reflected energy from scanning signal generators. Event sensors may be considered to comprise an array of detector cells that are responsive to energy reflected from scanning signal generators. Event sensors may provide outputs that indicate which detector cells are triggered and the time they are triggered. Event sensors may be considered to generate sensor outputs (events) that report the triggered cell location and time of detection for individual cells rather than being limited to reporting the state or status of every cell. For example, event sensors may include event sensor cameras, SPAD arrays, SiPM arrays, or the like.

As used herein the term "image sensor" refers to a device or system that can provide electronic scene information (electronic imaging) based on light or other energy collected at surface the image sensor. Conventionally, image sensors may be comprised of charge-coupled devices (CCDs) or complementary metal oxide semi-conductors (CMOS) devices. In some cases, image sensors may be referred to as frame capture cameras. Also, in some cases, image sensors may be deployed or otherwise used as to collect event information.

As used herein the terms "trajectory," "parametric trajectory," "surface trajectory" refers to one or more data structures that store or represent parametric representations of curve segments that may correspond to surfaces sensed by one or more sensors. Trajectories may include one or more attributes/elements that correspond to constants or coefficients of segments of one-dimensional analytical curves in three-dimensional space. Trajectories for a surface may be determined based on fitting or associating one or more sensor events to known analytical curves. Sensor events that are inconsistent with the analytical curves may be considered noise or otherwise excluded from trajectories.

As used herein the term "configuration information" refers to information that may include rule-based policies, pattern matching, scripts (e.g., computer readable instructions), or the like, that may be provided from various sources, including, configuration files, databases, user input, built-in defaults, plug-ins, extensions, or the like, or combination thereof.

The following briefly describes embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments are directed to the association of concurrent tracks using graph crossings. In one or more of the various embodiments, two or more signal beams may be employed to scan a plurality of paths across an object such that two or more sensors separately detect signals from the two or more signal beams reflected by the object.

In one or more of the various embodiments, a plurality of trajectories may be generated based on the separately detected signals such that each trajectory may be associated with one or more events that may correspond to the separately detected signals.

In one or more of the various embodiments, one or more crossing points may be determined based on a portion of the plurality of trajectories that intersect each other during the scan of the object.

In one or more of the various embodiments, one or more graphs may be generated based on the portion of trajectories and the one or more crossing points such that each edge in the one or more graphs corresponds to a crossing point and such that each node in the one or more graphs corresponds to a trajectory.

In one or more of the various embodiments, the one or more graphs may be compared to determine one or more matched graphs that share a common topology.

In one or more of the various embodiments, one or more common trajectories may be determined based on the one or more matched graphs such that each common trajectory may be associated with a same path across the object and a separate sensor.

In one or more of the various embodiments, one or more features of the object may be determined based on the one or more common trajectories.

In one or more of the various embodiments, determining the one or more common trajectories may include: determining a subset of the plurality of trajectories based on one or more characteristics of the plurality of trajectories such that the one or more characteristics may include one or more of a trajectory geometry or a trajectory position. In one or more of the various embodiments, the determined subset of the plurality of trajectories may be excluded from the determination of the one or more common trajectories.

In one or more of the various embodiments, determining the one or more crossing points may include: providing a first trajectory and a second trajectory from the plurality trajectories; determining a spatial coordinate value that corresponds to a location on the object based on the first and second trajectories; determining a first timestamp that corresponds to a time the first trajectory intersects the location; determining a second timestamp that corresponds to a time the second trajectory intersects the location; determining a crossing point based on the spatial coordinate value and the first timestamp and the second timestamp; or the like.

In one or more of the various embodiments, in response to determining a number of unmatched graphs that exceeds a threshold value, further actions may be performed, including: expanding the one or more graphs to include one or more additional nodes and one or more additional edges based on including one or more additional trajectories and one or more additional crossing points; determining one or more additional matched graphs based on a comparison of the one or more expanded graphs; or the like.

In one or more of the various embodiments, determining the one or more crossing points may include, determining one or more unambiguous crossing points associated with one or more candidate trajectories based on an absence of other crossing points occurring within a time range tolerance value, wherein each of the one or more candidate trajectories are determined to be in common with each other.

In one or more of the various embodiments, employing the sensing system may include generating the two or more signal beams based on light emitted by one or more lasers.

In one or more of the various embodiments, the two or more sensors may include one or more of an event sensor or an image sensor. In one or more of the various embodiments, determining the one or more features of the object based on the one or more common trajectories may include, determining one or more of a position, an orientation, a motion, a deformation of the object, or the like.

Illustrated Operating Environment

FIG. 1 shows components of one embodiment of an environment in which embodiments of the invention may be practiced. Not all of the components may be required to practice the invention, and variations in the arrangement and type of the components may be made without departing from the spirit or scope of the invention. As shown, system 100 of FIG. 1 includes local area networks (LANs)/wide area networks (WANs), such as, network 110, wireless network 108, client computers 102-105, application server computer 116, sensing systems 118, or the like.

At least one embodiment of client computers 102-105 is described in more detail below in conjunction with FIG. 2. In one embodiment, at least some of client computers 102-105 may operate over one or more wired or wireless networks, such as networks 108, or 110. Generally, client computers 102-105 may include virtually any computer capable of communicating over a network to send and receive information, perform various online activities, offline actions, or the like. In one embodiment, one or more of client computers 102-105 may be configured to operate within a business or other entity to perform a variety of services for the business or other entity. For example, client computers 102-105 may be configured to operate as a web server, firewall, client application, media player, mobile telephone, game console, desktop computer, or the like. However, client computers 102-105 are not constrained to these services and may also be employed, for example, as for end-user computing in other embodiments. It should be recognized that more or less client computers (as shown in FIG. 1) may be included within a system such as described herein, and embodiments are therefore not constrained by the number or type of client computers employed.

Computers that may operate as client computer 102 may include computers that typically connect using a wired or wireless communications medium such as personal computers, multiprocessor systems, microprocessor-based or programmable electronic devices, network PCs, or the like. In some embodiments, client computers 102-105 may include virtually any portable computer capable of connecting to another computer and receiving information such as, laptop computer 103, mobile computer 104, tablet computers 105, or the like. However, portable computers are not so limited and may also include other portable computers such as cellular telephones, display pagers, radio frequency (RF) devices, infrared (IR) devices, Personal Digital Assistants (PDAs), handheld computers, wearable computers, integrated devices combining one or more of the preceding computers, or the like. As such, client computers 102-105 typically range widely in terms of capabilities and features. Moreover, client computers 102-105 may access various computing applications, including a browser, or other web-based application.

A web-enabled client computer may include a browser application that is configured to send requests and receive responses over the web. The browser application may be configured to receive and display graphics, text, multimedia, and the like, employing virtually any web-based language. In one embodiment, the browser application is enabled to employ JavaScript, HyperText Markup Language (HTML), eXtensible Markup Language (XML), JavaScript Object Notation (JSON), Cascading Style Sheets (CS S), or the like, or combination thereof, to display and send a message. In one embodiment, a user of the client computer may employ the browser application to perform various activities over a network (online). However, another application may also be used to perform various online activities.

Client computers 102-105 also may include at least one other client application that is configured to receive or send content between another computer. The client application may include a capability to send or receive content, or the like. The client application may further provide information that identifies itself, including a type, capability, name, and the like. In one embodiment, client computers 102-105 may uniquely identify themselves through any of a variety of mechanisms, including an Internet Protocol (IP) address, a phone number, Mobile Identification Number (MIN), an electronic serial number (ESN), a client certificate, or other device identifier. Such information may be provided in one or more network packets, or the like, sent between other client computers, application server computer 116, sensing systems 118, or other computers.

Client computers 102-105 may further be configured to include a client application that enables an end-user to log into an end-user account that may be managed by another computer, such as application server computer 116, sensing systems 118, or the like. Such an end-user account, in one non-limiting example, may be configured to enable the end-user to manage one or more online activities, including in one non-limiting example, project management, software development, system administration, configuration management, search activities, social networking activities, browse various websites, communicate with other users, or the like. Also, client computers may be arranged to enable users to display reports, interactive user-interfaces, or results provided by sensing systems 118.

Wireless network 108 is configured to couple client computers 103-105 and its components with network 110. Wireless network 108 may include any of a variety of wireless sub-networks that may further overlay stand-alone ad-hoc networks, and the like, to provide an infrastructure-oriented connection for client computers 103-105. Such sub-networks may include mesh networks, Wireless LAN (WLAN) networks, cellular networks, and the like. In one embodiment, the system may include more than one wireless network.

Wireless network 108 may further include an autonomous system of terminals, gateways, routers, and the like connected by wireless radio links, and the like. These connectors may be configured to move freely and randomly and organize themselves arbitrarily, such that the topology of wireless network 108 may change rapidly.

Wireless network 108 may further employ a plurality of access technologies including 2nd (2G), 3rd (3G), 4th (4G) 5th (5G) generation radio access for cellular systems, WLAN, Wireless Router (WR) mesh, and the like. Access technologies such as 2G, 3G, 4G, 5G, and future access networks may enable wide area coverage for mobile computers, such as client computers 103-105 with various degrees of mobility. In one non-limiting example, wireless network 108 may enable a radio connection through a radio network access such as Global System for Mobil communication (GSM), General Packet Radio Services (GPRS), Enhanced Data GSM Environment (EDGE), code division multiple access (CDMA), time division multiple access (TDMA), Wideband Code Division Multiple Access (WCDMA), High Speed Downlink Packet Access (HSDPA), Long Term Evolution (LTE), and the like. In essence, wireless network 108 may include virtually any wireless communication mechanism by which information may travel between client computers 103-105 and another computer, network, a cloud-based network, a cloud instance, or the like.

Network 110 is configured to couple network computers with other computers, including, application server computer 116, sensing systems 118, client computers 102, and client computers 103-105 through wireless network 108, or the like. Network 110 is enabled to employ any form of computer readable media for communicating information from one electronic device to another. Also, network 110 can include the Internet in addition to local area networks (LANs), wide area networks (WANs), direct connections, such as through a universal serial bus (USB) port, Ethernet port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, or other carrier mechanisms including, for example, E-carriers, Integrated Services Digital Networks (ISDNs), Digital Subscriber Lines (DSLs), wireless links including satellite links, or other communications links known to those skilled in the art. Moreover, communication links may further employ any of a variety of digital signaling technologies, including without limit, for example, DS-0, DS-1, DS-2, DS-3, DS-4, OC-3, OC-12, OC-48, or the like. Furthermore, remote computers and other related electronic devices could be remotely connected to either LANs or WANs via a modem and temporary telephone link. In one embodiment, network 110 may be configured to transport information of an Internet Protocol (IP).

Additionally, communication media typically embodies computer readable instructions, data structures, program modules, or other transport mechanism and includes any information non-transitory delivery media or transitory delivery media. By way of example, communication media includes wired media such as twisted pair, coaxial cable, fiber optics, wave guides, and other wired media and wireless media such as acoustic, RF, infrared, and other wireless media.

Also, one embodiment of application server computer 116 or sensing systems 118 are described in more detail below in conjunction with FIG. 3. Although FIG. 1 illustrates application server computer 116 and sensing systems 118 each as a single computer, the innovations or embodiments are not so limited. For example, one or more functions of application server computer 116, sensing systems 118, or the like, may be distributed across one or more distinct network computers. Moreover, in one or more embodiments, sensing systems 118 may be implemented using a plurality of network computers. Further, in one or more of the various embodiments, application server computer 116, sensing systems 118, or the like, may be implemented using one or more cloud instances in one or more cloud networks. Accordingly, these innovations and embodiments are not to be construed as being limited to a single environment, and other configurations, and other architectures are also envisaged.

Illustrative Client Computer

Figure 2:
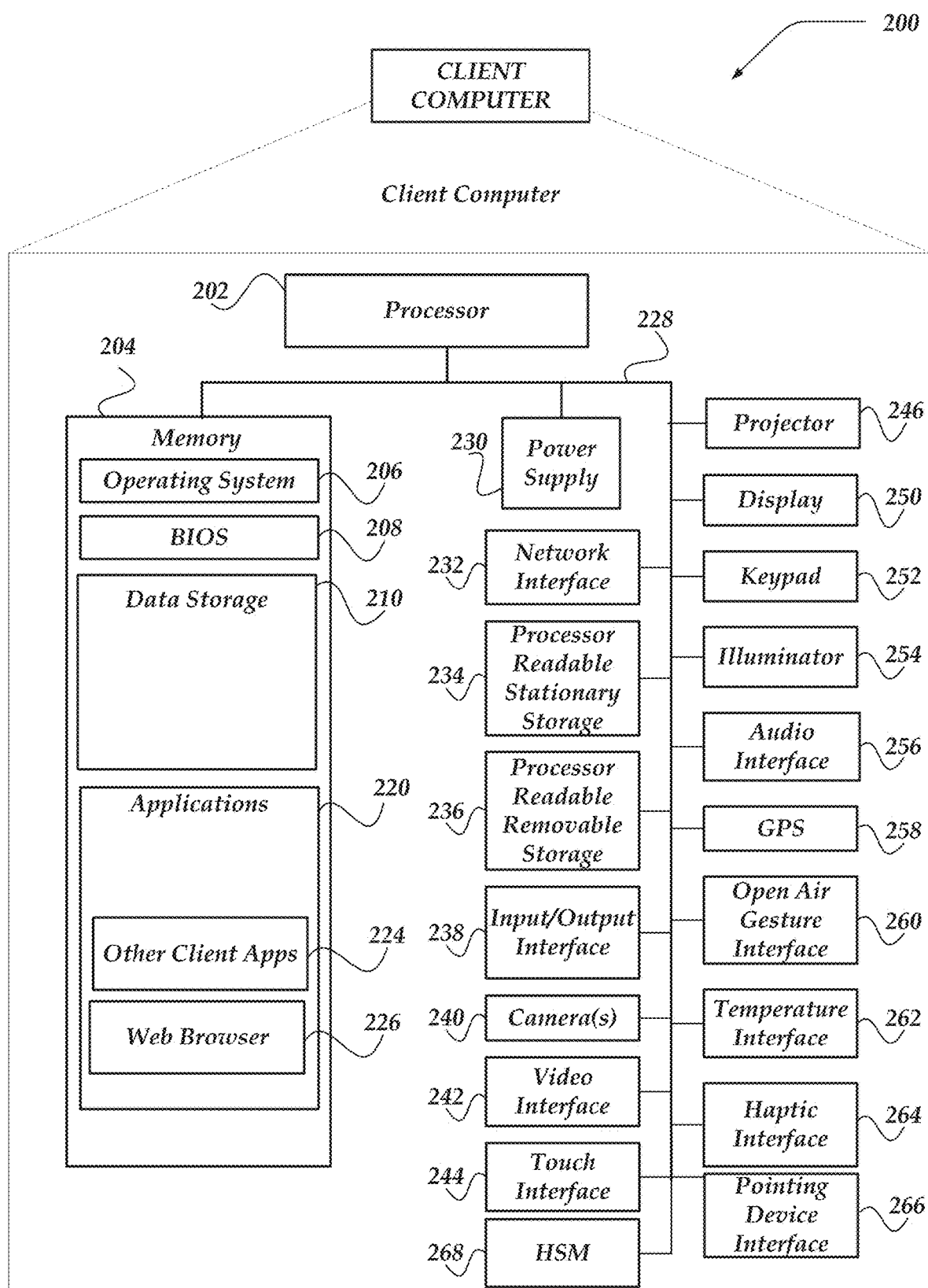
FIG. 2 illustrates a schematic embodiment of a client computer.

FIG. 2 shows one embodiment of client computer 200 that may include many more or less components than those shown. Client computer 200 may represent, for example, one or more embodiments of mobile computers or client computers shown in FIG. 1.

Client computer 200 may include processor 202 in communication with memory 204 via bus 228. Client computer 200 may also include power supply 230, network interface 232, audio interface 256, display 250, keypad 252, illuminator 254, video interface 242, input/output interface 238, haptic interface 264, global positioning systems (GPS) receiver 258, open air gesture interface 260, temperature interface 262, camera(s) 240, projector 246, pointing device interface 266, processor-readable stationary storage device 234, and processor-readable removable storage device 236. Client computer 200 may optionally communicate with a base station (not shown), or directly with another computer. And in one embodiment, although not shown, a gyroscope may be employed within client computer 200 to measuring or maintaining an orientation of client computer 200.

Power supply 230 may provide power to client computer 200. A rechargeable or non-rechargeable battery may be used to provide power. The power may also be provided by an external power source, such as an AC adapter or a powered docking cradle that supplements or recharges the battery.

Network interface 232 includes circuitry for coupling client computer 200 to one or more networks, and is constructed for use with one or more communication protocols and technologies including, but not limited to, protocols and technologies that implement any portion of the OSI model for mobile communication (GSM), CDMA, time division multiple access (TDMA), UDP, TCP/IP, SMS, MMS, GPRS, WAP, UWB, WiMax, SIP/RTP, GPRS, EDGE, WCDMA, LTE, UMTS, OFDM, CDMA2000, EV-DO, HSDPA, or any of a variety of other wireless communication protocols. Network interface 232 is sometimes known as a transceiver, transceiving device, or network interface card (MC).

Audio interface 256 may be arranged to produce and receive audio signals such as the sound of a human voice. For example, audio interface 256 may be coupled to a speaker and microphone (not shown) to enable telecommunication with others or generate an audio acknowledgement for some action. A microphone in audio interface 256 can also be used for input to or control of client computer 200, e.g., using voice recognition, detecting touch based on sound, and the like.

Display 250 may be a liquid crystal display (LCD), gas plasma, electronic ink, light emitting diode (LED), Organic LED (OLED) or any other type of light reflective or light transmissive display that can be used with a computer. Display 250 may also include a touch interface 244 arranged to receive input from an object such as a stylus or a digit from a human hand, and may use resistive, capacitive, surface acoustic wave (SAW), infrared, radar, or other technologies to sense touch or gestures.

Projector 246 may be a remote handheld projector or an integrated projector that is capable of projecting an image on a remote wall or any other reflective object such as a remote screen.

Video interface 242 may be arranged to capture video images, such as a still photo, a video segment, an infrared video, or the like. For example, video interface 242 may be coupled to a digital video camera, a web-camera, or the like. Video interface 242 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 252 may comprise any input device arranged to receive input from a user. For example, keypad 252 may include a push button numeric dial, or a keyboard. Keypad 252 may also include command buttons that are associated with selecting and sending images.

Illuminator 254 may provide a status indication or provide light. Illuminator 254 may remain active for specific periods of time or in response to event messages. For example, when illuminator 254 is active, it may backlight the buttons on keypad 252 and stay on while the client computer is powered. Also, illuminator 254 may backlight these buttons in various patterns when particular actions are performed, such as dialing another client computer. Illuminator 254 may also cause light sources positioned within a transparent or translucent case of the client computer to illuminate in response to actions.

Further, client computer 200 may also comprise hardware security module (HSM) 268 for providing additional tamper resistant safeguards for generating, storing or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, or store keys pairs, or the like. In some embodiments, HSM 268 may be a stand-alone computer, in other cases, HSM 268 may be arranged as a hardware card that may be added to a client computer.

Client computer 200 may also comprise input/output interface 238 for communicating with external peripheral devices or other computers such as other client computers and network computers. The peripheral devices may include an audio headset, virtual reality headsets, display screen glasses, remote speaker system, remote speaker and microphone system, and the like. Input/output interface 238 can utilize one or more technologies, such as Universal Serial Bus (USB), Infrared, WiFi, WiMax, Bluetooth™, and the like.

Input/output interface 238 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to client computer 200.

Haptic interface 264 may be arranged to provide tactile feedback to a user of the client computer. For example, the haptic interface 264 may be employed to vibrate client computer 200 in a particular way when another user of a computer is calling. Temperature interface 262 may be used to provide a temperature measurement input or a temperature changing output to a user of client computer 200. Open air gesture interface 260 may sense physical gestures of a user of client computer 200, for example, by using single or stereo video cameras, radar, a gyroscopic sensor inside a computer held or worn by the user, or the like. Camera 240 may be used to track physical eye movements of a user of client computer 200.

GPS transceiver 258 can determine the physical coordinates of client computer 200 on the surface of the Earth, which typically outputs a location as latitude and longitude values. GPS transceiver 258 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of client computer 200 on the surface of the Earth. It is understood that under different conditions, GPS transceiver 258 can determine a physical location for client computer 200. In one or more embodiment, however, client computer 200 may, through other components, provide other information that may be employed to determine a physical location of the client computer, including for example, a Media Access Control (MAC) address, IP address, and the like.

In at least one of the various embodiments, applications, such as, operating system 206, other client apps 224, web browser 226, or the like, may be arranged to employ geo-location information to select one or more localization features, such as, time zones, languages, currencies, calendar formatting, or the like. Localization features may be used in, file systems, user-interfaces, reports, as well as internal processes or databases. In at least one of the various embodiments, geo-location information used for selecting localization information may be provided by GPS 258. Also, in some embodiments, geolocation information may include information provided using one or more geolocation protocols over the networks, such as, wireless network 108 or network 111.

Human interface components can be peripheral devices that are physically separate from client computer 200, allowing for remote input or output to client computer 200. For example, information routed as described here through human interface components such as display 250 or keyboard 252 can instead be routed through network interface 232 to appropriate human interface components located remotely. Examples of human interface peripheral components that may be remote include, but are not limited to, audio devices, pointing devices, keypads, displays, cameras, projectors, and the like. These peripheral components may communicate over a Pico Network such as Bluetooth™, Zigbee™ and the like. One non-limiting example of a client computer with such peripheral human interface components is a wearable computer, which might include a remote pico projector along with one or more cameras that remotely communicate with a separately located client computer to sense a user's gestures toward portions of an image projected by the pico projector onto a reflected surface such as a wall or the user's hand.

A client computer may include web browser application 226 that is configured to receive and to send web pages, web-based messages, graphics, text, multimedia, and the like. The client computer's browser application may employ virtually any programming language, including a wireless application protocol messages (WAP), and the like. In one or more embodiment, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, and the like.

Memory 204 may include RAM, ROM, or other types of memory. Memory 204 illustrates an example of computer-readable storage media (devices) for storage of information such as computer-readable instructions, data structures, program modules or other data. Memory 204 may store BIOS 208 for controlling low-level operation of client computer 200. The memory may also store operating system 206 for controlling the operation of client computer 200. It will be appreciated that this component may include a general-purpose operating system such as a version of UNIX, or Linux®, or a specialized client computer communication operating system such as Windows Phone™, or the Symbian® operating system. The operating system may include, or interface with a Java virtual machine module that enables control of hardware components or operating system operations via Java application programs.

Memory 204 may further include one or more data storage 210, which can be utilized by client computer 200 to store, among other things, applications 220 or other data. For example, data storage 210 may also be employed to store information that describes various capabilities of client computer 200. The information may then be provided to another device or computer based on any of a variety of methods, including being sent as part of a header during a communication, sent upon request, or the like. Data storage 210 may also be employed to store social networking information including address books, buddy lists, aliases, user profile information, or the like. Data storage 210 may further include program code, data, algorithms, and the like, for use by a processor, such as processor 202 to execute and perform actions. In one embodiment, at least some of data storage 210 might also be stored on another component of client computer 200, including, but not limited to, non-transitory processor-readable removable storage device 236, processor-readable stationary storage device 234, or even external to the client computer.

Applications 220 may include computer executable instructions which, when executed by client computer 200, transmit, receive, or otherwise process instructions and data. Applications 220 may include, for example, other client applications 224, web browser 226, or the like. Client computers may be arranged to exchange communications, such as, queries, searches, messages, notification messages, event messages, sensor events, alerts, performance metrics, log data, API calls, or the like, combination thereof, with application servers or network monitoring computers.

Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth.

Additionally, in one or more embodiments (not shown in the figures), client computer 200 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), client computer 200 may include one or more hardware microcontrollers instead of CPUs.

In one or more embodiment, the one or more microcontrollers may directly execute their own embedded logic to perform actions and access its own internal memory and its own external Input and Output Interfaces (e.g., hardware pins or wireless transceivers) to perform actions, such as System On a Chip (SOC), or the like.

Illustrative Network Computer

Figure 3:
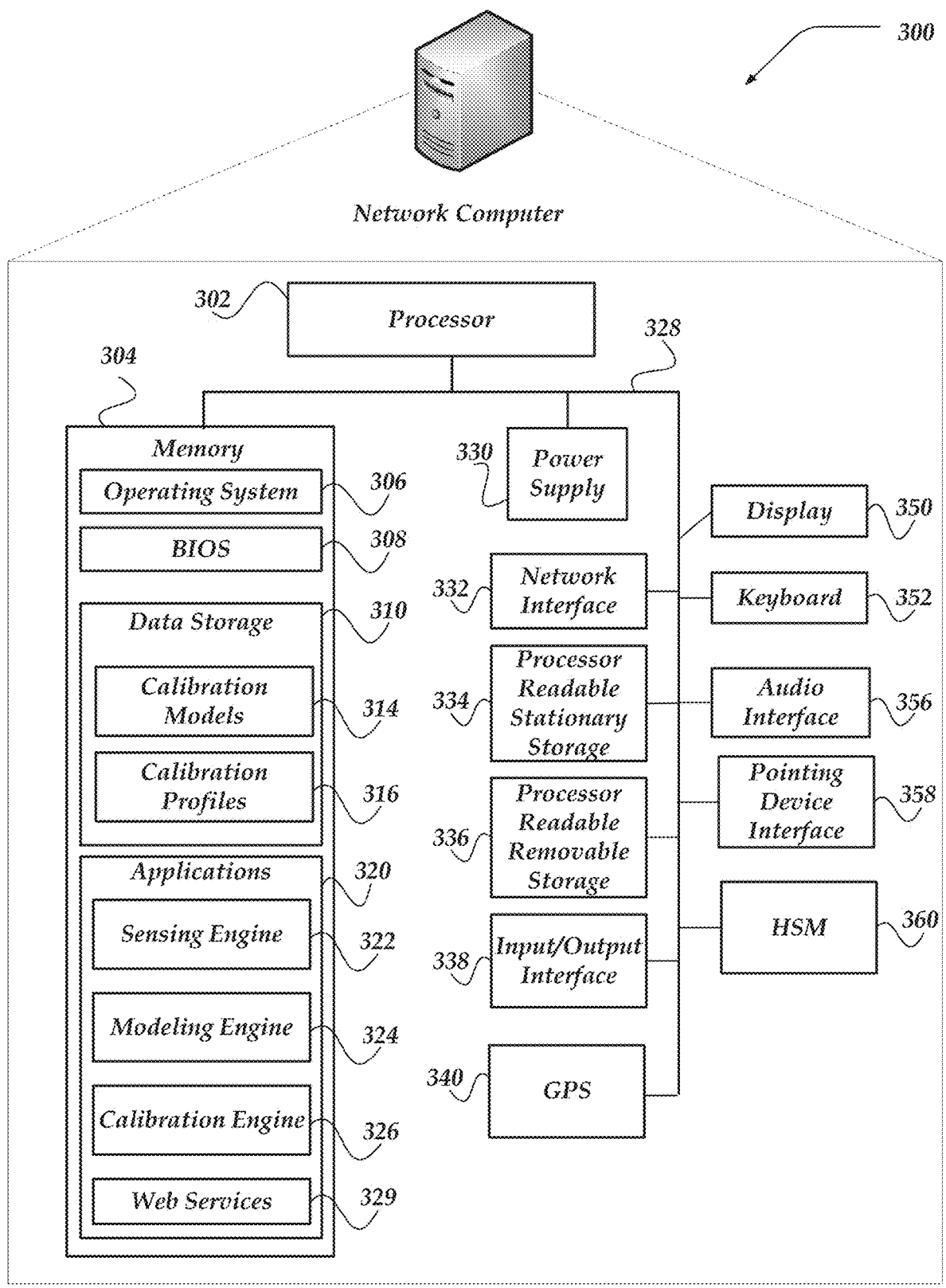
FIG. 3 illustrates a schematic embodiment of a network computer.

FIG. 3 shows one embodiment of network computer 300 that may be included in a system implementing one or more of the various embodiments. Network computer 300 may include many more or less components than those shown in FIG. 3. However, the components shown are sufficient to disclose an illustrative embodiment for practicing these innovations. Network computer 300 may represent, for example, one embodiment of at least one of application server computer 116, or sensing systems 118 of FIG. 1.

Network computers, such as, network computer 300 may include a processor 302 that may be in communication with a memory 304 via a bus 328. In some embodiments, processor 302 may be comprised of one or more hardware processors, or one or more processor cores. In some cases, one or more of the one or more processors may be specialized processors designed to perform one or more specialized actions, such as, those described herein. Network computer 300 also includes a power supply 330, network interface 332, audio interface 356, display 350, keyboard 352, input/output interface 338, processor-readable stationary storage device 334, and processor-readable removable storage device 336. Power supply 330 provides power to network computer 300.

Network interface 332 includes circuitry for coupling network computer 300 to one or more networks, and is constructed for use with one or more communication protocols and technologies including, but not limited to, protocols and technologies that implement any portion of the Open Systems Interconnection model (OSI model), global system for mobile communication (GSM), code division multiple access (CDMA), time division multiple access (TDMA), user datagram protocol (UDP), transmission control protocol/Internet protocol (TCP/IP), Short Message Service (SMS), Multimedia Messaging Service (MMS), general packet radio service (GPRS), WAP, ultra-wide band (UWB), IEEE 802.16 Worldwide Interoperability for Microwave Access (WiMax), Session Initiation Protocol/Real-time Transport Protocol (SIP/RTP), or any of a variety of other wired and wireless communication protocols. Network interface 332 is sometimes known as a transceiver, transceiving device, or network interface card (NIC). Network computer 300 may optionally communicate with a base station (not shown), or directly with another computer.

Audio interface 356 is arranged to produce and receive audio signals such as the sound of a human voice. For example, audio interface 356 may be coupled to a speaker and microphone (not shown) to enable telecommunication with others or generate an audio acknowledgement for some action. A microphone in audio interface 356 can also be used for input to or control of network computer 300, for example, using voice recognition.

Display 350 may be a liquid crystal display (LCD), gas plasma, electronic ink, light emitting diode (LED), Organic LED (OLED) or any other type of light reflective or light transmissive display that can be used with a computer. In some embodiments, display 350 may be a handheld projector or pico projector capable of projecting an image on a wall or other object.

Network computer 300 may also comprise input/output interface 338 for communicating with external devices or computers not shown in FIG. 3. Input/output interface 338 can utilize one or more wired or wireless communication technologies, such as USB™, Firewire™, WiFi, WiMax, Thunderbolt™, Infrared, Bluetooth™, Zigbee™, serial port, parallel port, and the like.

Also, input/output interface 338 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to network computer 300. Human interface components can be physically separate from network computer 300, allowing for remote input or output to network computer 300. For example, information routed as described here through human interface components such as display 350 or keyboard 352 can instead be routed through the network interface 332 to appropriate human interface components located elsewhere on the network. Human interface components include any component that allows the computer to take input from, or send output to, a human user of a computer. Accordingly, pointing devices such as mice, styluses, track balls, or the like, may communicate through pointing device interface 358 to receive user input.

GPS transceiver 340 can determine the physical coordinates of network computer 300 on the surface of the Earth, which typically outputs a location as latitude and longitude values. GPS transceiver 340 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of network computer 300 on the surface of the Earth. It is understood that under different conditions, GPS transceiver 340 can determine a physical location for network computer 300. In one or more embodiments, however, network computer 300 may, through other components, provide other information that may be employed to determine a physical location of the client computer, including for example, a Media Access Control (MAC) address, IP address, and the like.

In at least one of the various embodiments, applications, such as, operating system 306, sensing engine 322, modeling engine 324, calibration engine 326, web services 329, or the like, may be arranged to employ geo-location information to select one or more localization features, such as, time zones, languages, currencies, currency formatting, calendar formatting, or the like. Localization features may be used in file systems, user-interfaces, reports, as well as internal processes or databases. In at least one of the various embodiments, geo-location information used for selecting localization information may be provided by GPS 340. Also, in some embodiments, geolocation information may include information provided using one or more geolocation protocols over the networks, such as, wireless network 108 or network 111.

Memory 304 may include Random Access Memory (RAM), Read-Only Memory (ROM), or other types of memory. Memory 304 illustrates an example of computer-readable storage media (devices) for storage of information such as computer-readable instructions, data structures, program modules or other data. Memory 304 stores a basic input/output system (BIOS) 308 for controlling low-level operation of network computer 300. The memory also stores an operating system 306 for controlling the operation of network computer 300. It will be appreciated that this component may include a general-purpose operating system such as a version of UNIX®, or Linux®, or a specialized operating system such as Microsoft Corporation's Windows® operating system, or the Apple Corporation's macOS® operating system. The operating system may include, or interface with one or more virtual machine modules, such as, a Java virtual machine module that enables control of hardware components or operating system operations via Java application programs. Likewise, other runtime environments may be included.

Memory 304 may further include one or more data storage 310, which can be utilized by network computer 300 to store, among other things, applications 320 or other data. For example, data storage 310 may also be employed to store information that describes various capabilities of network computer 300. The information may then be provided to another device or computer based on any of a variety of methods, including being sent as part of a header during a communication, sent upon request, or the like. Data storage 310 may also be employed to store social networking information including address books, buddy lists, aliases, user profile information, or the like. Data storage 310 may further include program code, data, algorithms, and the like, for use by a processor, such as processor 302 to execute and perform actions such as those actions described below. In one embodiment, at least some of data storage 310 might also be stored on another component of network computer 300, including, but not limited to, non-transitory media inside processor-readable removable storage device 336, processor-readable stationary storage device 334, or any other computer-readable storage device within network computer 300, or even external to network computer 300. Data storage 310 may include, for example, calibration models 314, calibration profiles 316, or the like.

Applications 320 may include computer executable instructions which, when executed by network computer 300, transmit, receive, or otherwise process messages (e.g., SMS, Multimedia Messaging Service (MMS), Instant Message (IM), email, or other messages), audio, video, and enable telecommunication with another user of another mobile computer. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth. Applications 320 may include sensing engine 322, modeling engine 324, calibration engine 326, web services 329, or the like, which may be arranged to perform actions for embodiments described below. In one or more of the various embodiments, one or more of the applications may be implemented as modules or components of another application. Further, in one or more of the various embodiments, applications may be implemented as operating system extensions, modules, plugins, or the like.

Furthermore, in one or more of the various embodiments, sensing engine 322, modeling engine 324, calibration engine 326, web services 329, or the like, may be operative in a cloud-based computing environment. In one or more of the various embodiments, these applications, and others, which comprise the management platform may be executing within virtual machines or virtual servers that may be managed in a cloud-based based computing environment. In one or more of the various embodiments, in this context the applications may flow from one physical network computer within the cloud-based environment to another depending on performance and scaling considerations automatically managed by the cloud computing environment. Likewise, in one or more of the various embodiments, virtual machines or virtual servers dedicated to sensing engine 322, modeling engine 324, calibration engine 326, web services 329, or the like, may be provisioned and de-commissioned automatically.

Also, in one or more of the various embodiments, sensing engine 322, modeling engine 324, calibration engine 326, web services 329, or the like, may be located in virtual servers running in a cloud-based computing environment rather than being tied to one or more specific physical network computers.

Further, network computer 300 may also comprise hardware security module (HSM) 360 for providing additional tamper resistant safeguards for generating, storing or using security/cryptographic information such as, keys, digital certificates, passwords, passphrases, two-factor authentication information, or the like. In some embodiments, hardware security module may employ to support one or more standard public key infrastructures (PKI), and may be employed to generate, manage, or store keys pairs, or the like. In some embodiments, HSM 360 may be a stand-alone network computer, in other cases, HSM 360 may be arranged as a hardware card that may be installed in a network computer.

Additionally, in one or more embodiments (not shown in the figures), network computer 300 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), the network computer may include one or more hardware microcontrollers instead of a CPU. In one or more embodiment, the one or more microcontrollers may directly execute their own embedded logic to perform actions and access their own internal memory and their own external Input and Output Interfaces (e.g., hardware pins or wireless transceivers) to perform actions, such as System On a Chip (SOC), or the like.

Illustrative Logical System Architecture

Figure 4:
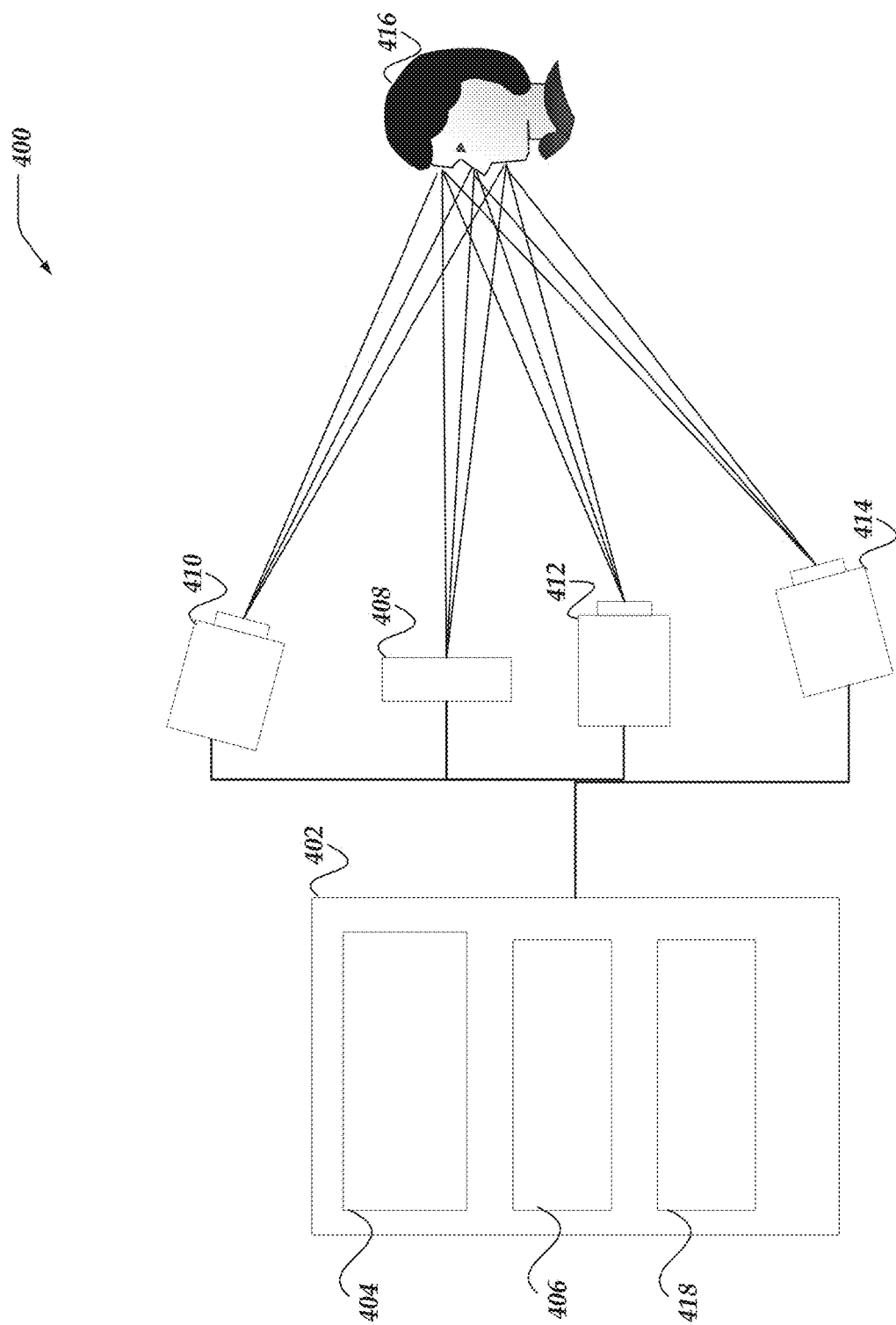
FIG. 4 illustrates a logical architecture of a system for association of concurrent tracks using graph crossings in accordance with one or more of the various embodiments.

FIG. 4 illustrates a logical architecture of system 400 for association of concurrent tracks using graph crossings in accordance with one or more of the various embodiments.

In this example, for some embodiments, sensing systems, such as system 400 may include one or more servers, such as sensing server 402. In some embodiments, sensing servers may be arranged to include: one or more sensing engines, such as, sensing engine 404; one or more modeling engines, such as, modeling engine 406; one or more calibration engines, such as, calibration engine 418.

Also, in some embodiments, sensing systems may include one or more signal generators that may at least generate sensor information based on where the energy from the signal generator reflects from a surface. In this example, for some embodiments, signal generator 408 may be considered to be a laser scanning system. Further, in some embodiments, sensing systems may include one or more event sensors that generate events based on the reflected signal energy (e.g., laser beam paths). Also, in some embodiments, sensing systems may include one or more image sensors that may be configured to capture scene information, reflected signal energy, or the like. In this example, for some embodiments, the sensors may be arranged to generate sensor information that corresponds to the reflected signal energy. In this example, sensors may include event sensor 410, event sensor 412, and event sensor 414.

Accordingly, in some embodiments, the 2D sensor information from each sensor may be provided to a sensing engine, such as, sensing engine 404. In some embodiments, sensing engines may be arranged to synthesize the 2D points provided by the sensors into 3D points based on triangulation, or the like.

Further, in some embodiments, sensing engines may be arranged to direct the signal generator (e.g., scanning laser 408) to follow one or more patterns based on one or more path-functions. Thus, in some embodiments, signal generators may scan the one or more objects or surface area using a known and precise scanning path that may be defined or described using one or more functions that correspond to the curve/path of the scanning.

Accordingly, in some embodiments, sensing engines may be arranged to synthesize information about the objects or surfaces scanned by the signal generator based on the 3D sensor information provided by the sensors and the known scanning curve pattern.

In some embodiments, scanning signal generator 408 may be implemented using one or more fast laser scanning devices, such as a dual-axis MEMS mirror that scans a laser beam. In some embodiments, the wavelength of the laser may be in a broad range from the UV into the IR. In some embodiments, scanning signal generators may be designed to scan up to frequencies of 10 s of kHz. In some embodiments, scanning signal generators may be controlled in a closed loop fashion using one or more processors that may provide feedback about the objects in the environment and instruct the scanning signal generator to adapt one or more of amplitude, frequency, phase, or the like. In some cases, for some embodiments, scanning signal generators may be arranged to periodically switch on and off, such as, at points if the scanner may be slowing before changing direction or reversing direction.

In some embodiments, system 400 may include one or more event sensors, such as, event sensor 410, event sensor 412, or the like. In some embodiments, event sensors may comprise arrays of pixels or cells that are responsive to reflected signal energy. In some embodiment, event sensors may be arranged such that some or all of the event sensors share a portion of their fields of view with one another and with the scanning signal generator. Further, in some embodiments, the relative position and poses of each sensor may be known. Also, in some embodiments, each event sensor may employ synchronized clocks. For example, in some embodiments, event sensors may be time synchronized by using a clock of one event sensor as the master clock or by using an external source that periodically sends a synchronizing signal to the event sensors. Alternatively, in some embodiments, sensors may be arranged to provide events to sensing engines independently or asynchronously of each other. In some embodiments, scanning event cameras may be employed as sensors.

Also, in some embodiments, system 400 may include one or more image sensors (not shown). In some embodiments, image sensors may be configured to capture one or more frames or images of the scene being sensed. In some embodiments, the captured images may include some or all of the same surface/objects being scanned by the signal generator.

Accordingly, as a beam from the scanning signal generator beam scans across the scene, the event sensors sense reflected signal energy (e.g., photons/light from lasers) and trigger events based on their cells/pixels that detect reflected signal energy in the scene. Accordingly, in some embodiments, each event (e.g., sensor event) generated by an event sensor may be determined based on cell location and a timestamp based on where and when the reflected energy is detected in each sensor. Thus, in some embodiments, each event sensor may report each sensor event independently as it is detected rather than collecting information/signal from the entire sensor array before providing the sensor event. This behavior may be considered distinguishable from image sensors that may include pixel arrays or CCDs which may 'raster scan' the entire array of cells before outputting signal data in the form of frame or images. In contrast, event sensors, such as, event sensor 410, event sensor 412, or the like, may immediately and continuously report signals (if any) from individual cells. Accordingly, the cells in an individual event sensor do not share a collective exposure time rather each cell reports its own detected events. Accordingly, in some embodiments, sensors, such as, event sensor 410, event sensor 412, or the like, may be based on event sensor cameras, single photon avalanche diode (SPAD) sensors, silicon photo-multipliers (SiPM) arrays, or the like.

Also, in some embodiments, in conjunction with events from event sensors, sensing system 400 may collect images from one or more image sensors, such as, image sensor 414. Accordingly, in one or more of the various embodiments, images may represent a snapshot in time of the scene being scanned.

Figure 5:
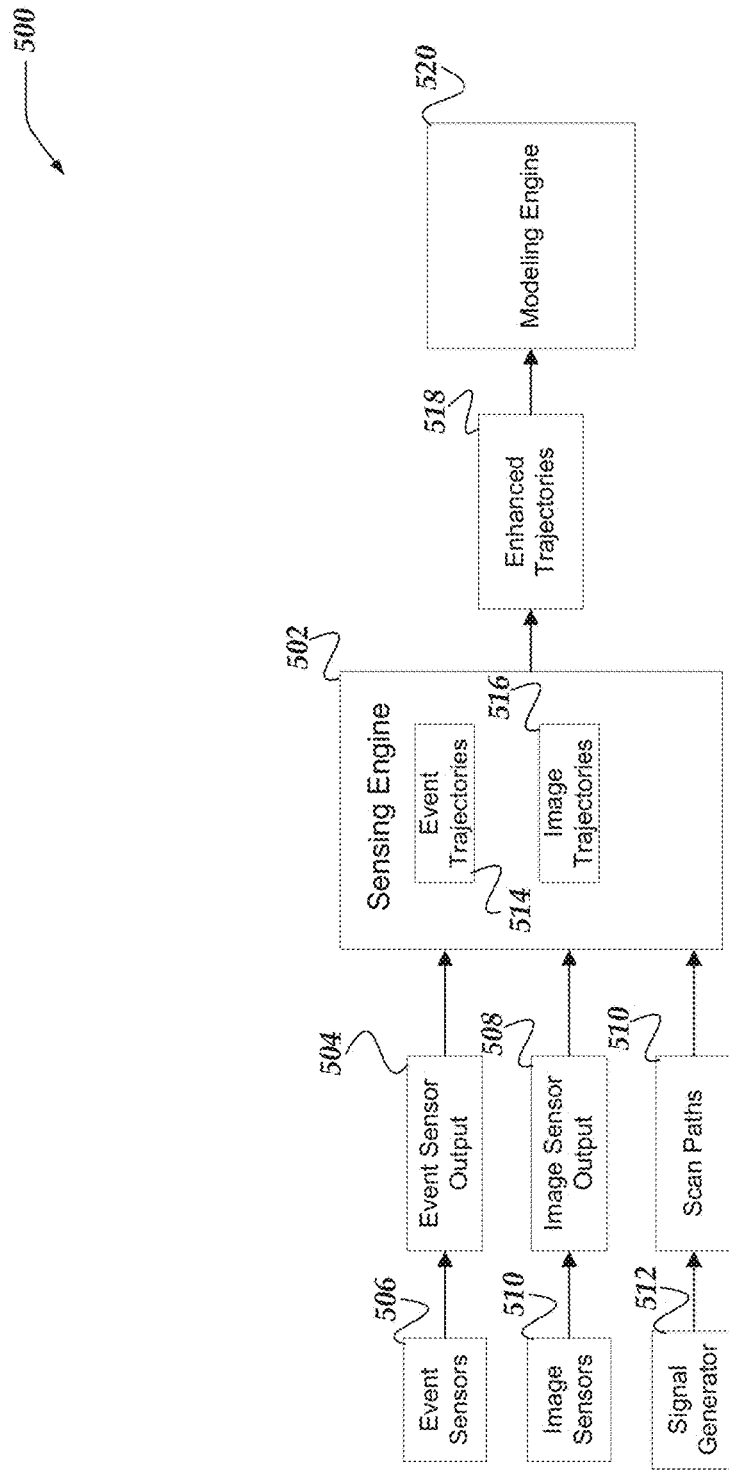
FIG. 5 illustrates a logical schematic of a system for association of concurrent tracks using graph crossings in accordance with one or more of the various embodiments.

FIG. 5 illustrates a logical schematic of system 500 for association of concurrent tracks using graph crossings in accordance with one or more of the various embodiments. In some embodiments, sensing engines, such as, sensing engine 502 may be arranged to be provided sensor outputs from one or more event sensors or one or more image sensors. In some embodiments, sensors outputs from event sensors may include information, such as, event hit location, pixel location, event timestamps, or the like, that may be associated with sensor events. Also, in some embodiments, sensor outputs may include images, frames, or the like, captured by image sensors. As described above, in some embodiments, signal generators, such as, scanning lasers may scan an area of interest such that reflections of the energy may be collected by one or more event sensors and one or more image sensors. Accordingly, in some embodiments, information from each sensor may be provided to sensing engine 502.

Also, in some embodiments, sensing engine 502 may be provided a scanning path that corresponds to the scanning path of the scanning signal generator. Accordingly, in some embodiments, sensing engine 502 may employ the scanning path to determine the path that the scanning signal generator traverses to scan the area of interest.

Accordingly, in some embodiments, sensing engine 502 may be arranged to recognize sensor events that may correspond to a surface location in three-dimensions based on the sensor output. For example, if there may be three sensors, the sensing engine may employ triangulation to compute the location in the area of interest where the scanning signal energy was reflected. One of ordinary skill in the art will appreciate that triangulation or other similar techniques may be applied to determine the scanned location if the position of the sensors is known.

In some embodiments, scanning signal generators (e.g., fast scanning lasers) may be configured to execute a precision scanning pattern. Accordingly, in some embodiments, sensing engine 502 may be provided the particular scanning path function. Also, in some embodiments, sensing engine 502 may be arranged to determine the particular scanning path based on configuration information to account for local circumstances of local requirements.

In one or more of the various embodiments, sensing engines, such as, sensing engine 502 may generate a sequence of surface trajectories that may be based on the scan path and the sensor information synthesized from the sensor output 504.

Figure 6:
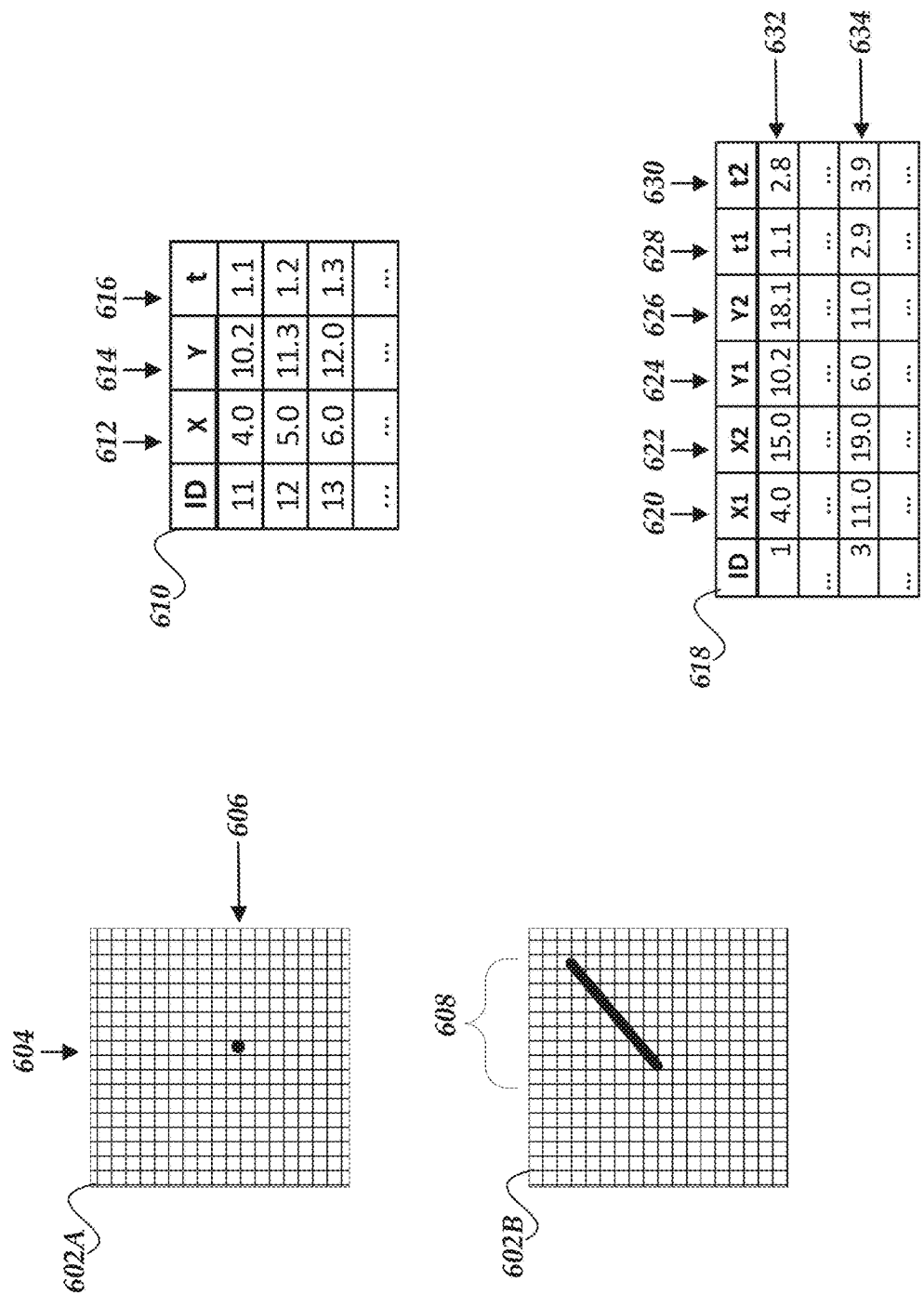
FIG. 6 illustrates a logical representation of sensors and sensor output information for association of concurrent tracks using graph crossings in accordance with one or more of the various embodiments.

FIG. 6 illustrates a logical representation of sensors and sensor output information for association of concurrent tracks using graph crossings in accordance with one or more of the various embodiments.

In one or more of the various embodiments, sensing engines may be provided sensor output from various sensors. In this example, for some embodiments, sensor 602A may be considered to represent a generic sensor that may emit signals that correspond to the precise location on the sensor where reflected energy from the scanning signal generator may be detected. For example, sensor 602A may be considered an array of detector cells that reports the cell location of the cell that has detected energy reflected from the scanning signal generator. In this example, horizontal location 604 and vertical location 606 may be considered to represent a location corresponding to the location in sensor 602 where reflected signal energy has been detected.

In one or more of the various embodiments, sensing engines may be arranged to receive sensor information for one or more detection events from one or more sensors. Accordingly, in some embodiments, sensing engines may be arranged to determine additional information about the source of the reflected energy (beam location on scanned surface) based on triangulation or other methods. In some embodiments, if sensing engines employs triangulation or other methods to locate the location of the signal beam in the scanning environment, the combined sensor information may be considered a single sensor event comprising a horizontal (x) location, vertical location (y) and time component (t). Also, in some embodiments, sensor event may include other information, such as, time-of-flight information depending on the type or capability of the sensors.

Further, as described above, the scanning signal generator (e.g., scanning laser) may be configured to traverse a precise path/curve (e.g., scanning path). Accordingly, in some embodiments, the pattern or sequence of cells in the sensors that detect reflected energy will follow a path/curve that is related to the path/curve of the scanning signal generator. Accordingly, in some embodiments, if the signal generator scans a particular path/curve a related path/curve of activated cells in the sensors may be detected. Thus, in this example, for some embodiments, path 608 may represent a sequence of cells in sensor 602B that have detected reflected energy from the scanning signal generator.

In one or more of the various embodiments, sensing engines may be arranged to fit sensor events to the scanning path curve. Accordingly, in one or more of the various embodiments, sensing engines may be arranged to predict where sensor events should occur based on the scanning path curve to determine information about the location or orientation of scanned surfaces or objects. Thus, in some embodiments, if sensing engines receive sensor events that are unassociated with the known scanning path curve, sensing engines may be arranged to perform various actions, such as, closing the current trajectory and beginning a new trajectory, discarding the sensor event as noise, or the like.

In one or more of the various embodiments, scanning path curves may be configured in advance within the limits or constraints of the scanning signal generator and the sensors. For example, a scanning signal generator may be configured or directed to scan the scanning environment using various curves including Lissajous curves, 2D lines, or the like. In some cases, scanning path curves may be considered piecewise functions in that they may change direction or shape at different parts of the scan. For example, a 2D line scan path may be configured to change direction if the edge of the scanning environment (e.g., field-of-view) is approached.

One of ordinary skill in the art will appreciate that if an unobstructed surface is scanned, the scanning frequency, scanning path, and sensor response frequency may determine if the sensor detection path appears as a continuous path. Thus, the operational requirements of the scanning signal generator, sensor precision, sensor response frequency, or the like, may vary depending on application of the system. For example, if the scanning environment may be relatively low featured and static, the sensors may have a lower response time because the scanned environment is not changing very fast. Also, for example, if the scanning environment is dynamic or includes more features of interest, the sensors may require increased responsiveness or precision to accurately capture the paths of the reflected signal energy. Further, in some embodiments, the characteristics of the scanning signal generator may vary depending on the scanning environment. For example, if lasers are used for the scanning signal generator, the energy level, wavelength, phase, beam width, or the like, may be tuned to suit the environment.

In one or more of the various embodiments, sensing engines may be provided sensor output as a continuous stream of sensor events or sensor information that identifies the cell location in the sensor cell-array and a timestamp that corresponds to when the detection event occurred.

In this example, for some embodiments, data structure 610 may be considered a data structure for representing sensor events based on sensor output provided to a sensing engine. In this example, column 612 represents the horizontal position of the location in the scanning environment, column 614 represents a vertical position in the scanning environment, and column 616 represents the time of the event. Accordingly, in some embodiments, sensing engines may be arranged to determine which (if any) sensor events should be associated with a trajectory. In some embodiments, sensing engines may be arranged to associate sensor events with existing trajectories or create new trajectories. In some embodiments, if the sensor events fit an expected/predicted curve as determined based on the scanning path curve, sensing engines may be arranged to associate the sensor events with an existing trajectory or create a new trajectory. Also, in some cases, for some embodiments, sensing engines may be arranged to determine one or more sensor event as noise if their location deviates from a predicted path beyond a defined threshold value.

In one or more of the various embodiments, sensing engines may be arranged to determine sensor events for each individual sensor rather being limited to provide sensor events computed based on outputs from multiple sensors. For example, in some embodiments, sensing engines may be arranged to provide a data structure similar to data structure 610 to collect sensor events for individual sensors.

In some embodiments, sensing engines may be arranged to generate a sequence of trajectories that correspond to the reflected energy/signal paths detected by the sensors. In some embodiments, sensing engines may be arranged to employ one or more data structures, such as, data structure 618 to represent a trajectory that may be determined based on the information captured by the sensors. In this example, data structure 610 may be table-like structure that includes columns, such as, column 620 for storing a first x-position, column 622 for storing a second x-position, column 624 for storing a first y-position, column 626 for storing a second y-position, column 628 for storing the beginning time of a trajectory, column 630 for storing an end time of a trajectory, of the like.

In this example, row 632 represents information for a first trajectory and row 634 represents information for another trajectory. As described herein, sensing engines may be arranged to employ one or more rules or heuristics to determine if one trajectory ends and another begins. In some embodiments, such heuristics may include observing the occurrence sensor events that are geometrically close or temporally close. Note, the particular components or elements of a trajectory may vary depending on the parametric representation of the analytical curve or the type of analytical curve associated with the scanning path and the shape or orientation of the scanned surfaces. Accordingly, one of ordinary skill in the art will appreciate that different types of analytical curves or curve representations may result in more or fewer parameters for each trajectory. Thus, in some embodiments, sensing engines may be arranged to determine the specific parameters for trajectories based on rules, templates, libraries, or the like, provided via configuration information to account for local circumstances or local requirements In one or more of the various embodiments, trajectories may be represented using curve parameters rather than a collection of individual points or pixels. Accordingly, in some embodiments, sensing engines may be arranged to employ one or more numerical methods to continuously fit sequences of sensor events to scanning path curves.

Further, in some embodiments, sensing engines may be arranged to employ one or more smoothing methods to improve the accuracy of trajectories or trajectory fitting. For example, in some embodiments, the scanning curve may be comprised of sensor events triggered by a scanning laser that may not be one cell wide because in some cases reflected energy may splash to neighboring cells or land on the border of two or more cells. Accordingly, in some embodiments, to better estimate the real position of the reflected signal beam as it traverses the sensor plane, sensing engines may be arranged to perform an online smoothing estimate, e.g., using a smoothing Kalman filter to predict where the scanning beam point should have been in fractional units of detector cell position and fractional units of the fundamental timestamp of the sensor. Also, in some embodiments, sensing engines may be arranged to employ a batch-based optimization routine such as weighted least squares to fit a smooth curve to continuous segments of the scanning trajectory, which may correspond to when the scanning signal generator beam was scanning over a continuous surface.

Also, in some embodiments, the scanning path may be employed to determine if trajectories begin or end. For example, if the scanning path reaches an edge of a scanning area and changes direction, in some cases, a current trajectory may be terminated while a new trajectory may be started to begin capturing information based on the new direction of the scan. Also, in some embodiments, objects or other features that occlude or obstruct scanning energy or reflected scanning energy may result in breaks in the sensor output that introduce gaps or other discontinuities that may trigger a trajectory to be closed and another trajectory to be opened subsequent to the break or gap. Further, in some embodiments, sensing engines may be configured to have a maximum length of trajectories such that a trajectory may be closed if it has collected enough sensor events or enough time has elapsed from the start of the trajectory.

Also, in some embodiments, sensing engines may be arranged to determine trajectories for individual sensor. Accordingly, in some embodiments, sensing engines may be arranged to provide data structures similar to data structure 618 for each sensor.

Figure 7:
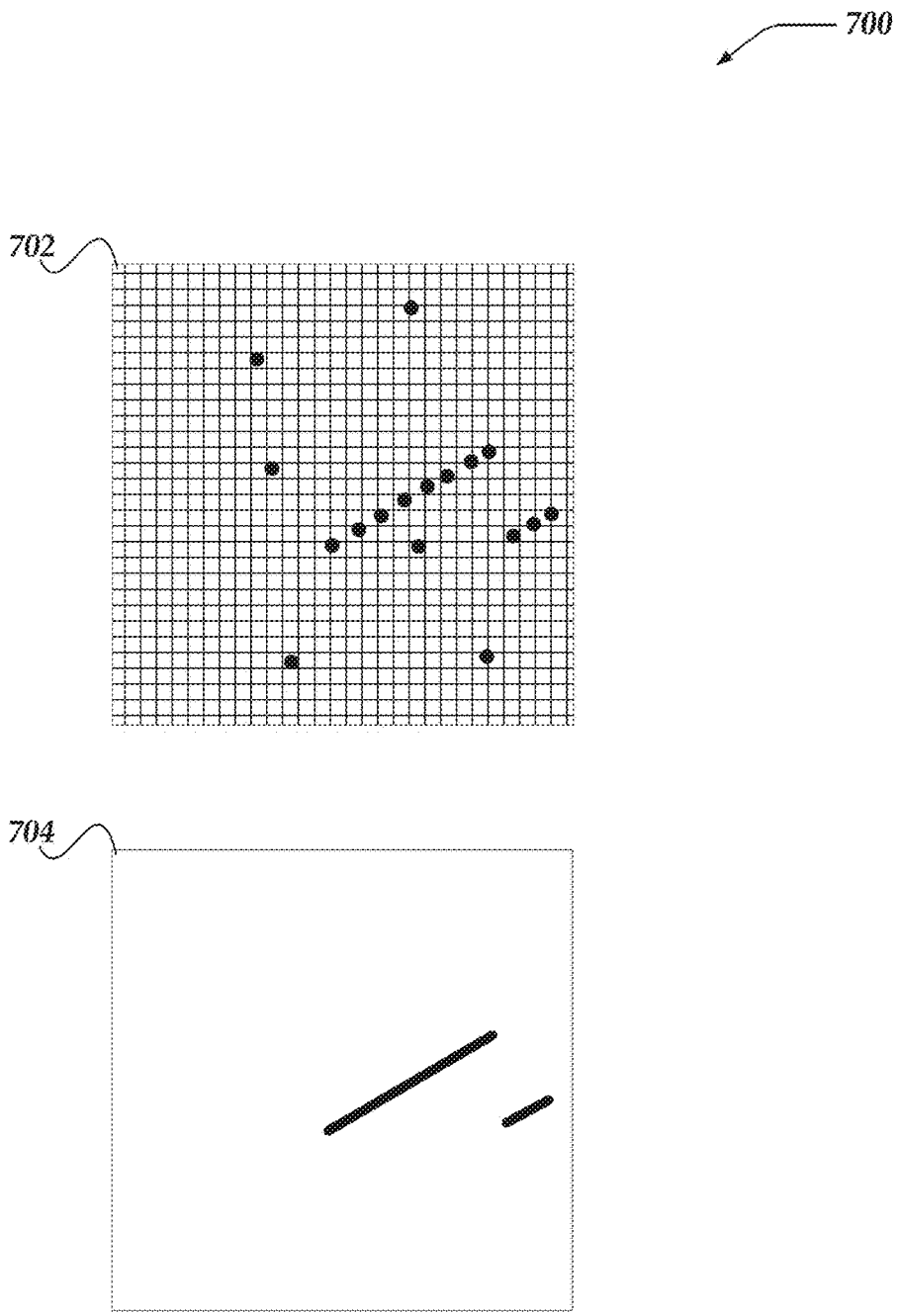
FIG. 7 illustrates a logical schematic of a system for association of concurrent tracks using graph crossings in accordance with one or more of the various embodiments.

FIG. 7 illustrates a logical schematic of system 700 for association of concurrent tracks using graph crossings in accordance with one or more of the various embodiments. As described above, in some embodiments, scanning signal generators may scan for surfaces in scanning environments. In some cases, conditions of the scanning environment or characteristics of the scanned surfaces may result in one or more spurious sensor events (e.g., noise) generated by one or more sensors. For example, sensor view 702 represents a portion of sensor events that may be generated during a scan.

In conventional machine vision applications, one or more 2D filters may be applied to a captured video image, point clusters, or the like, to attempt to separate noise events from the signals of interest. In some cases, conventional 2D image-based filters may be disadvantageous because they may employ one or more filters (e.g., weighted moving averaging, Gaussian filters, or the like) that may rely on statistical evaluation of pixel color/weight, pixel color/weight gradients, pixel distribution/clustering, or the like. Accordingly, in some cases, conventional 2D image filtering may be inherently fuzzy and highly dependent on application/environmental assumptions. Also, in some cases, conventional noise detection/noise reduction methods may erroneously miss some noise events while at the same time misclassifying one or more scene events as noise.

In contrast, in some embodiments, sensing engines may be arranged to associate sensor events into trajectories based on precise heuristics, such as, nearness in time and location that may be used to fit sensor events to analytical curves that may be predicted based on the scanning path. Because scanning paths are defined in advance, sensing engines may be arranged to predict which sensor events should be included in the same trajectory. See, trajectory view 704.

Further, in some embodiments, if surface or object features create gaps or breaks in trajectories, sensing engines may be arranged to close the current trajectory and start a new trajectory as soon as one may be recognized.

Also, in some embodiments, sensing engines may be arranged to determine trajectories directly from sensor events having the form (x, y, t) rather than employing fuzzy pattern matching or pattern recognition methods. Thus, in some embodiments, sensing engines may be arranged to accurately compute distance, direction, or the like, rather than relying fuzzy machine vision methods to distinguish noise from sensor events that should be in the same trajectory.

In one or more of the various embodiments, calibration engines may be arranged to employ rules, instructions, heuristics, or the like, for classifying sensor events as noise that may be provided via configuration information to account for local requirements or local circumstances that may be associated with a sensing applications or sensors.

Figure 8A:
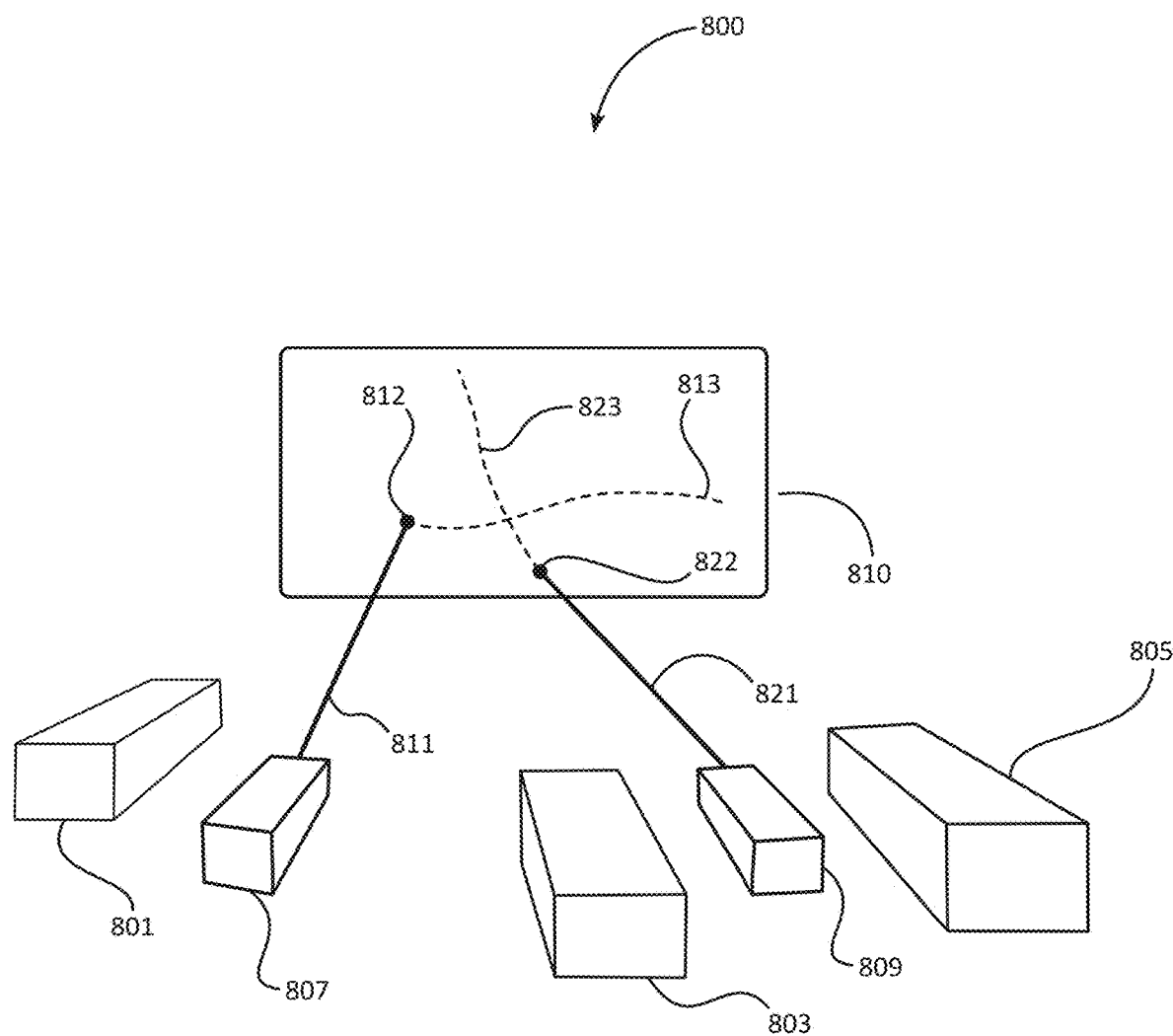
FIG. 8A shows a logical schematic of a sensing system in accordance with one or more of the various embodiments.

FIG. 8A shows a logical schematic of sensing system 800 in accordance with one or more of the various embodiments.

For some embodiments, system 800 shows a plurality of beams scanning over objects. In some embodiments, systems, such as, system 800 may be used for 3D image measurements or for other sensing/imaging applications. In some embodiments, scanning laser 807 may scan beam 811 across one or more objects. In this illustration, for some embodiments, flat object 810 is depicted in the field of view of all the system event cameras as well as within the scanning range, but multiple objects of various sizes and shapes might be used. At any given time, beam 811 may reflect off spot 812 on the surface of object 810. In some embodiments, path 813 traced out by the beam is shown as a dotted line. Similarly, another scanning laser 809 is used to scan another beam 828 over objects in the scene. Trajectory 823 traced out by spot 822 may be on the same object (object 810) as beam 811 simultaneously but may also be scanning other objects or the background of the scene at that time. In this example, two beams are shown scanning object 810, but more could be used as well. In some embodiments, movement and timing of each beam may be correlated with one another, but in some embodiments, some or all of the movement and timing of the beams may be completely uncorrelated.

In this example, system 800 includes three event cameras as shown, though more or fewer event cameras may be used without departing from the scope of the innovations detailed herein. In some embodiments, event camera 801, event camera 803, and event camera 805 may be considered event cameras, such that each pixel in an event camera may independently report changes in light level at the pixel level. In some embodiments, typical events reported by such cameras may be reported/recorded in the form (x, y, t), where x and y are the positions of the event on the event camera sensor array, and t is the timestamp of the event.

In some embodiments, the resolution of the event camera in time may be constrained by the speed at which the event camera may report events in the event camera globally. Further, one or more well-known effects, such as, time jitter, event timestamp arbiter circuitry, or the like, may also limited the accuracy or precision or event cameras in sensing systems.

In some embodiments, event cameras may provide a resolution of each event down to 1 μs but may be able to report events at a faster rate as the technology improves. In some cases, event cameras may be implemented using CMOS light level changes at each pixel, avalanche photodiode arrays, single photon avalanche diode (SPAD) arrays, or other methods. In some embodiments, scanning laser systems may be particularly effective at triggering events at the event camera, since the relatively bright reflections are very distinguishable from background light and other signal noise. Since pixels in event cameras tend to be uncorrelated with each other, each pixel may in principle trigger at the same or similar times as many other pixels on the sensor array of the event camera. In general, event cameras in systems, such as system 800 may be considered to be time synchronized with each other down to the time resolution of the event cameras. In practice, for some embodiments, this resolution may be 1 μs or less. In some cases, for some embodiments, synchronization may be accomplished using signal cables between different event cameras. Also, in some embodiments, synchronization may be accomplished by calculating the local time at each event camera using crossing points of trajectories measured at all event cameras substantially simultaneously. Also, in some embodiments, time coded signals may be embedded into laser signals themselves.

However, in some cases, the particular method of synchronization may be less important than matching either events or curve fit portions of trajectories to equivalent events or trajectories measured substantially simultaneously among the various event cameras.

In conventional image analysis among cameras for 3D measurement, positions of cameras and then positions of 3D objects may be ascertained by using point correspondences, where collections of points, lines, and other objects may be extracted from the image scene at each camera. In some cases, conventionally determining points to use from each camera perspective can lead to considerable error in the final result calculations, because, in some cases, it may not be clear how the exact position of each point to be measured can be extracted precisely from each image. Moreover, in some cases, larger errors may result if features measured at each camera may be confused for similar looking features, leading to point mismatch. For example, in some cases, noise, calibration error, or the like, may result in sensing engine erroneously associating unrelated events from different event cameras. Thus, in some cases, modeling engines may be confused by the erroneously matched events.

In one or more of the various embodiments, if using system 800 for an application such as 3D measurement of objects, if the position of a point such as point 812 may be measured precisely at a given time in more than one event camera, the position of the point in 3D space may be calculated using triangulation. Accordingly, in some embodiments, instead of measuring geometric features of the imaged objects for triangulation, the position of a beam scanned over the object surface may be used since the position of the spot measured at any given time may be ascertained more closely on each event camera. In some embodiments, this process may be simpler if there may be only one beam scanning over the surface of the object, but two or more beams may be scanned over the object simultaneously to increase the speed of scanning. For example, in some case, this may be needed if higher resolutions scans may be desired and particularly if the object may be moving with respect to the system. Also, in some embodiments, if there may be two or more points visible by each event camera, there may be ambiguity in the point matching. For instance, it may be possible based on their current location for point 812 on event camera 801 to be incorrectly matched with point 822 on event camera 805, leading to incorrect calculations of the position of the 3D point. In some cases, for some embodiments, this ambiguity may become more pronounced if more points may be measured substantially simultaneously. Similarly, in some embodiments, it may not be apparent which trajectory from one event camera may be properly matched to trajectories corresponds to other event cameras. For example, in some embodiments, trajectory 813 and trajectory 823 as measured on event camera 801 may be incorrectly identified as trajectory 823 and trajectory 813 respectively on event camera 803. In some cases, such errors may become more likely if the scanning systems use more concurrent beams scanning the scene.

Figure 8B:
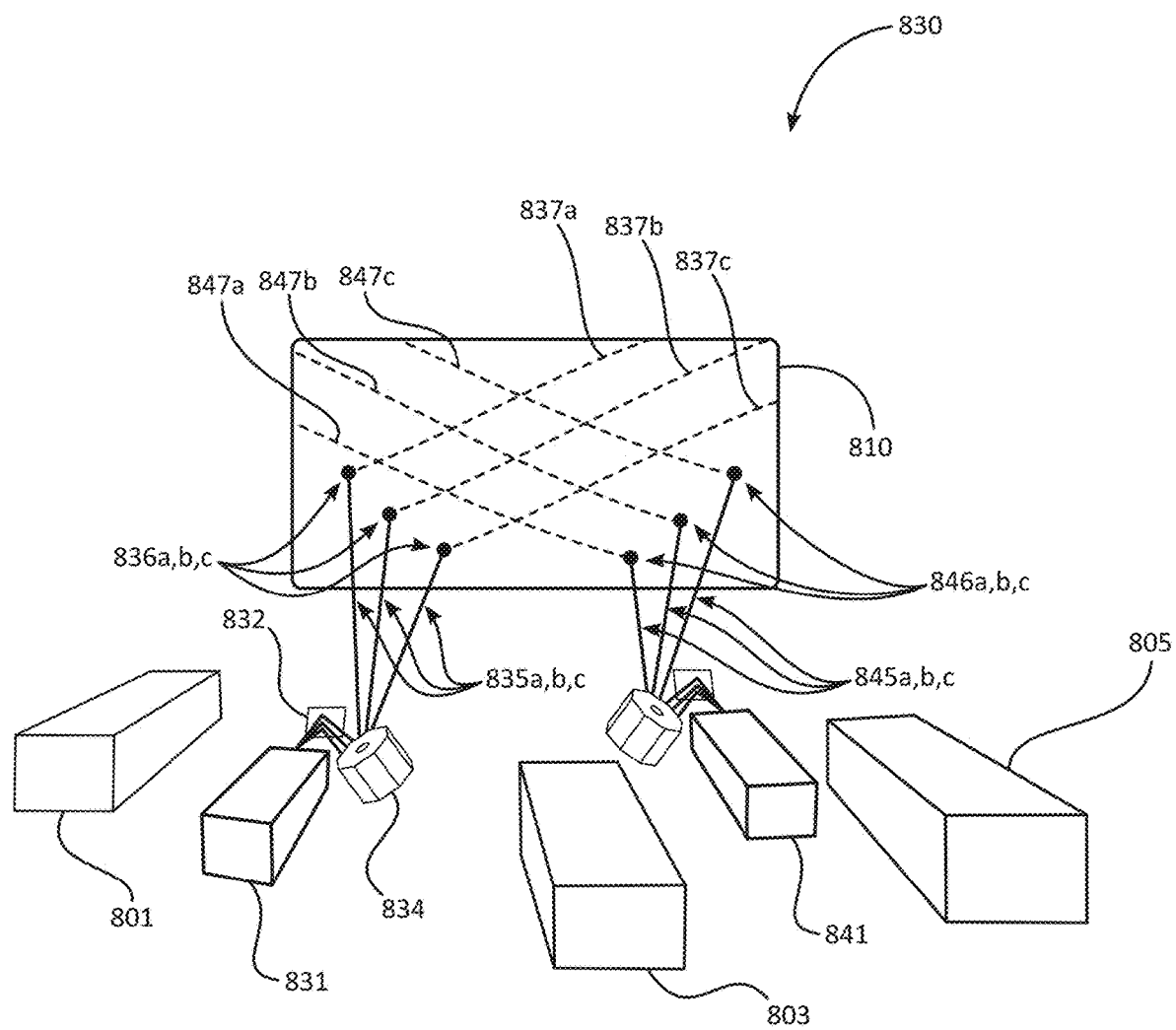
FIG. 8B illustrates a logical representation of a system where scanning subsystem 831 and scanning subsystem 841 may each output multiple beams in accordance with one or more of the various embodiments.
Figure 8C:
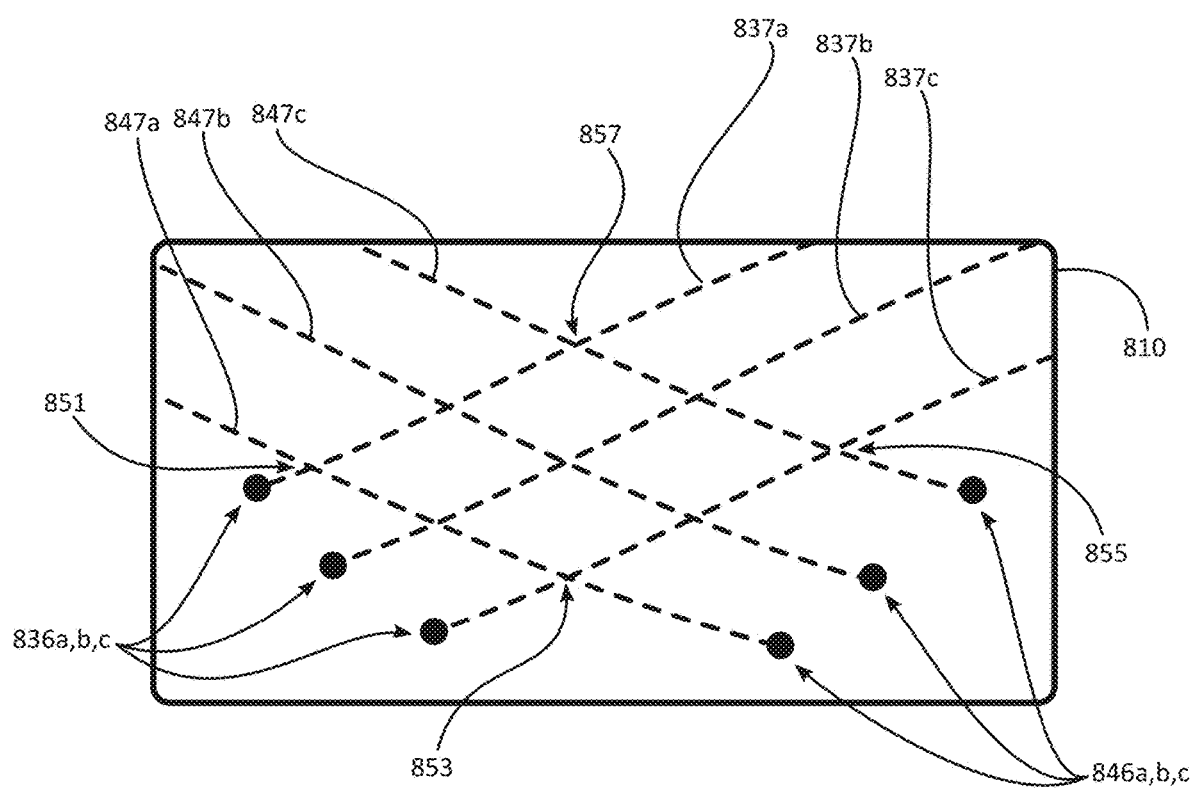
FIG. 8C illustrates a logical representation of a close-up view of a portion of the system shown in FIG. 8B in accordance with one or more of the various embodiments.

FIG. 8B illustrates a logical representation of system 830 where scanning subsystem 831 and scanning subsystem 841 may each output multiple beams in accordance with one or more of the various embodiments. In this example, one or more laser beams may be aimed onto scanning mirror 832 and then to a rotating polygonal mirror, such as, rotating polygonal mirror 834. Accordingly, in this example, three beams (e.g., beam 835a, beam 835b, or beam 836c) may scan over object 810 at different locations. In this example, for some embodiments, spot 836a, spot 836b, and spot 836cc may be arranged to trace trajectory 837a, trajectory 837b, and trajectory 837c respectively across object 810. Also, in this example, for some embodiments, scanning subsystem 841 similarly scans spot 846a, spot 846b, and spot 846c along trajectory 847a, trajectory 847b, and trajectory 847c. In some embodiments, beams from different scanning subsystem 831 may be generally correlated with one another but they may or may not be correlated in either position or timing with beams from subsystem 841. Accordingly, in some embodiments, with sufficient speed, the scanning systems may cover the entire scene (e.g., object 810 and its surrounds) with varying trajectories hundreds or thousands of times per second. Note, for clarity in the following discussion, FIG. 8C shows a close-up view of object 810 with associated points and scan traces as seen in FIG. 8B. Note that the scan traces are depicted as dotted lines for clarity but show the trajectory of a continuous beam in most cases.

In one or more of the various embodiments, if two or more event cameras may be calibrated with respect to each other, then the position and rotation of each event camera may be considered to be known. In some embodiments, if multiple trajectories may be measured concurrently with multiple event cameras, techniques such as epipolar matching may be used to identify and match trajectories among the event cameras, but this can only be done under proper calibration. If the event cameras have not been calibrated, or alternately if the event cameras may be configured to be calibrated dynamically, then epipolar matching may not be available for this purpose. In some cases, calibration of the event camera systems may be readily performed using a single scanned beam to generate sufficient trajectories in each event camera, but in some cases, it may be desirable to calibrate using multiple beams at once. For example, in some embodiments, multiple beams might be created using a beam splitting element, thus it may be impractical to turn off all but one of the beams.

Accordingly, in some embodiments, graph crossings may be used to identify and match trajectories from each uncalibrated event camera to one another.

FIG. 8C illustrates a logical representation of a close-up view of a portion of FIG. 8B in accordance with one or more of the various embodiments. For clarity in the following discussion, FIG. 8C illustrates a close-up view of object 810 with associated points and scan traces as seen in FIG. 8B. Note that the scan traces are depicted as dotted lines for clarity, but represent the trajectory of a continuous beam in most cases.

Figure 9:
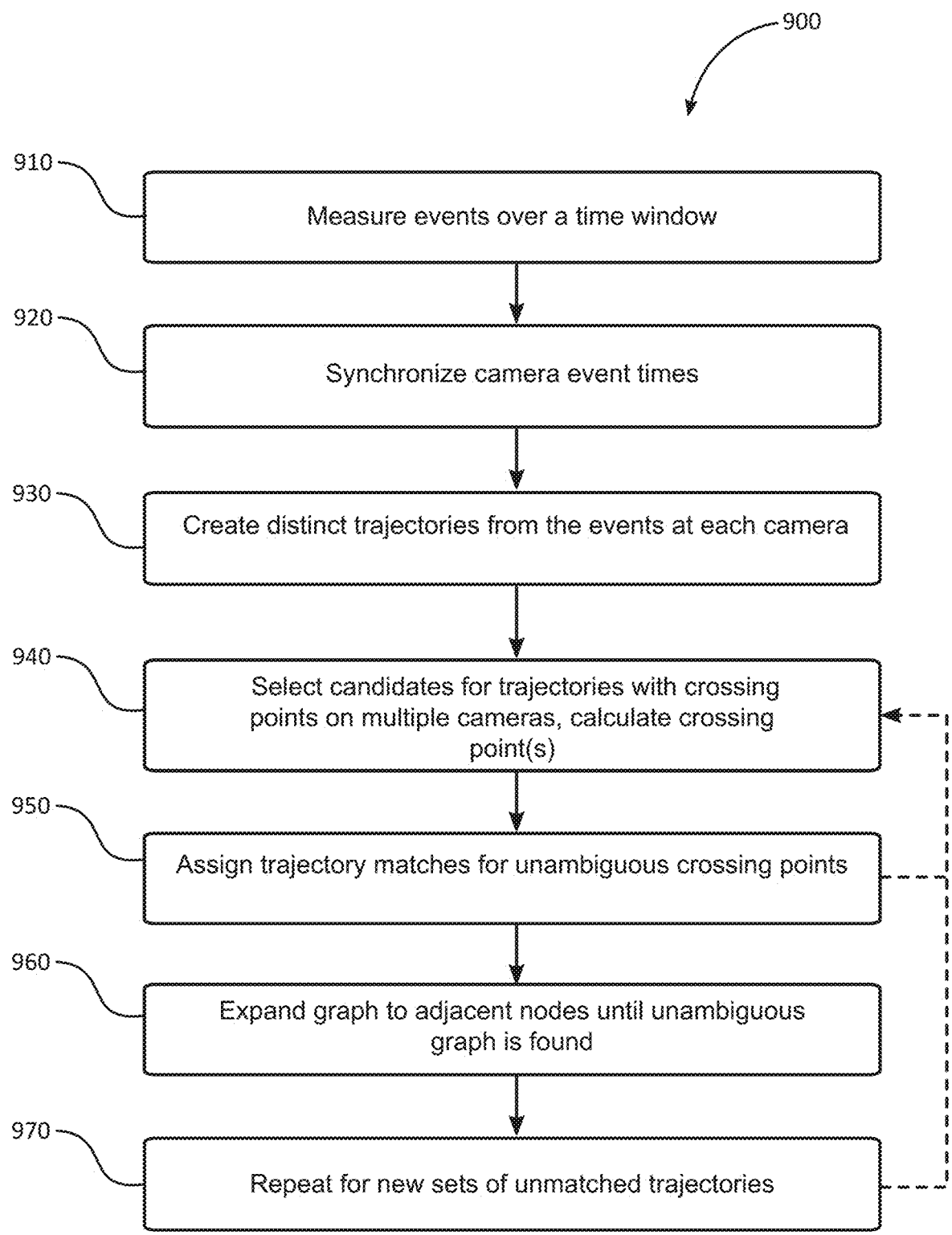
FIG. 9 illustrates an overview flowchart of a process for association of concurrent tracks using graph crossings in accordance with one or more of the various embodiments.

FIG. 9 illustrates an overview flowchart of process 900 for association of concurrent tracks using graph crossings in accordance with one or more of the various embodiments. In some cases, detailed descriptions below may refer to system 800 as described above.

In one embodiment, graph crossings may be used to identify and match trajectories from each uncalibrated event camera to one another. Process 900 executes one or more actions for association of concurrent tracks using graph crossings.

In step 910, in one or more of the various embodiments, sensing engines may be arranged to capture one or more events by scanning over the system over an arbitrary time window. In one or more of the various embodiments, sensing engines may be arranged to determine the particular time window duration based on rules, parameter values, instructions, or the like, provided via configuration information to account for local circumstances or local requirements. For example, in some cases, organizations may determine the particular time window value experimentally by comparing experimental sensing results associated with different time windows.

In some embodiments, sensing engines may be arranged to continuously scan the subject areas and capture events. Also, in some embodiments, sensing engines may be arranged to log some or all events captured by event cameras for analysis. Accordingly, in some embodiments, sensing engines may be arranged to analyze a subset to the logged event information to determine trajectories and crossings based on corresponding timestamp information. Further, in some embodiments, scanning systems such as system 130 may be arranged to analyze events from different signal sensors, such as, event camera 801, event camera 803, or event camera 105 separately.

In step 920, in one or more of the various embodiments, sensing systems may be configured such that event cameras or signal sensors may be time-synchronized with each other. In some cases, this calibration may be accomplished using clock signal cables between the event cameras using the time base of a master event camera to dictate the time at the other event cameras, but this may also be accomplished using the event data as described later. Note, one of ordinary skill in the art will appreciate that time-synchronizing the various components that comprise sensing systems may be accomplished in various ways that may be selected based on one or more of the particular arrangement or configuration of the sensing systems, the subject being sensing, the sensing environment, the particular application the where the sensing information is to be employed, or the like.

In step 930, in one or more of the various embodiments, sensing engines may be arranged to generate one or more distinct trajectories from events provided from each event camera. This process has been described elsewhere but in general events may be generated by scanning beams across various surfaces in the scene continuously, and this may involve comparing the timestamps and positions of new events with other events proximal both in space and time on the signal sensor; if the new events may be close enough, sensing engines may be arranged to associate them with a trajectory. Path 837*a* and Path 837*b* may be considered to be examples of assigned trajectories that may be measured at each event camera, though these show trajectories in process. As pixels on each event camera may report events uncorrelated with other pixels, multiple events and trajectories may be measured substantially simultaneously. If a trajectory ends, the events may be fit to a functional form corresponding the curve of a trajectory. For some embodiments, in the case where the event cameras may be uncalibrated, computations for fitting the events to trajectories may be kept in the image coordinate space of the event camera sensor. The spatial coordinates may be fit to the (x,y) coordinates of the image space, but because the events that create the curve may be also timestamped, the equation may be time-parameterized.

In step 940, in one or more of the various embodiments, sensing engines may be arranged to determine one or more trajectories as candidates for determining crossing points with other trajectories associated with the same event camera. FIG. 8C shows some example crossing points, including crossing point 851, crossing point 853, crossing point 855, and crossing point 857. In this example, crossing point 851 may be where trajectory 837*a* and trajectory 847*a* may cross over each other on object 810. The other crossing points may be generated similarly from different trajectories. Note, in some cases, one or more crossing points may be virtual crossing points. Accordingly, in some embodiments, sensing engines may be arranged to employ one or more line intersection detectors to determine if trajectories may be cross each other. In some embodiments, sensing engines may be arranged to employ rules, instructions, tolerance values, or the like, for determining line intersections based on configuration information to account for local circumstances or local requirements. For example, in some applications faster less accurate line intersection detectors may be employed while in some other applications slower more precise line intersection detectors may be employed. Also, for example, observed results may inform users that particular intersection detectors may be advantageous over other in given applications. Accordingly, for example, sensing engines may be arranged to enable users to modify configuration information to select or modify particular line intersection detectors.

In one or more of the various embodiments, it may be unlikely that multiple laser beams may traverse the exact crossing point in space on the object at the same time; rather the virtual crossing point may describe the point of space where the paths may cross each other at different times. Accordingly, in some embodiments, if the object remains stationary between the two times, the crossing point may be at the same spatial location at the different times, but if the object may be moving, this position will vary. For purposes of matching trajectories though, small errors in the position of the apparent crossing point will not change the crossing times significantly, and so a moving object may not affect the matching accuracy depending on the scanning rate. FIG. 8C represents the beams crossing the actual object, but the trajectories measured of the beams crossing the object may be then imaged on each event camera.

In some cases, for some embodiments, shapes of the trajectories may not exactly correspond on each event camera to the shapes on the object or with each other, since each event camera may be viewing the scene from its own diverse perspective, but they may be related. If much or all of two trajectories that intersect on the object may be visible to more than one event camera, then the trajectories may appear to cross on each event camera. Because the trajectories may meet in the image sensor space and function forms have been fit to both trajectories, the crossing point (x, y) which fits on both equations may be determined, or else shown that the two trajectories do not cross in the image sensor space. Although in the example shown, path 847a and path 837a may have one crossing point, some paths as measured might curve in such a way that they cross each other two or more times; these crossing points may also be determined by sensing engines. Depending on the number of events that were fit to create the time-parameterized function form of each trajectory, each crossing point may be determined with subpixel accuracy, and the timestamps of the crossing point might likewise be determined to higher precision than the resolution of the event cameras.

In one or more of the various embodiments, sensing engines may be arranged to generate crossing points that may have the general form of (x, y, $t_f$, $t_s$), where (x, y) represent the spatial coordinates on the image sensor, $t_f$ may be the timestamp of the first trajectory to cross that point on the event camera, and $t_s$ may be the second trajectory to cross that same point. For example, in event camera 801, crossing point 851 may have parameters ($x_{801}$, $y_{801}$, $t_{f801}$, $t_{s801}$) and crossing point 851 imaged on event camera 803 may have parameters ($x_{803}$, $y_{803}$, $t_{f803}$, $t_{s803}$). At this point, ($x_{801}$, $y_{801}$) and ($x_{803}$, $y_{803}$) may be most likely uncorrelated, but the timestamps may be highly correlated. If synchronization between the two event cameras may be accurate to the resolution of the event cameras, then $t_{f801}=t_{f803}$ and $t_{s801}=t_{s803}$.

In some embodiments, sensing engines may be configured to repeat this process for an arbitrary number of trajectories in a particular time window. In some embodiments, sensing engines may be arranged to evaluate one or more trajectories on each event camera to determine one or more crossing points between various pairs of trajectories. Alternatively, in some embodiments, sensing engines may be arranged to determine a subset of the pairs of trajectories that may be likely to have crossing points may be calculated first. In some embodiments, secondary characteristics may be used to determine pairs, such as geometry, position, or the like. For instance, because of the scanning layout of scanning laser 831, trajectory 837a, trajectory 837b, trajectory 837c may be unlikely to ever cross each other on the single pass across the scene. Accordingly, in some embodiments, sensing engines may be arranged to one or more rules, heuristics, filters, instructions, or the like, from via configuration information for selecting candidate trajectories to account for local circumstances or local requirements.

Note, in some cases, the time window of events may include one or more trajectories that may cross over other trajectories that were created by the same beam. Though the example shown in FIG. 8C may be a snapshot in time showing a single pass of the scanning system, the time window for trajectory matching using crossing points may include an arbitrary number of scans by each beam over the scene. In some embodiments, the scanning system may be configured such that each beam may cover a reasonably high portion of the area of the scene imaged in varying directions, it may be likely that beams may cross themselves commonly. Since the trajectory fitting process may process each unique trajectory and may fit them regardless of the beam that creates the events. In some cases, for some embodiments, sensing engines may be arranged to determine crossing points within the chosen time window based on calculating beams that were on an object at the same time, but similar crossing points may also be calculated between two trajectories that were created at different times within the same time window.

In step 950, in some embodiments, sensing engines may be arranged to first assign trajectory matches for crossing points that may be unambiguous in time as compared to other crossing points. For example, in some embodiments, a candidate matched crossing point on two event cameras may fulfill the earlier condition $t_{f1}=t_{f2}$ and $t_{s1}=t_{s2}$ for any two event cameras in a scanning system. Accordingly, for this crossing point to be unique, there would be no other interfering crossing points with the exact same $t_f$ and $t_s$. Since events captured may be occasionally subject to time jitter or other noise, in practice a tolerance time may be set, $t_{tol}$, so that a second crossing point nearer than time $t_{tol}$ to the first crossing point would make the match ambiguous. The tolerance time may be on or near the order of magnitude of the time resolution of the event camera but may be configured experimentally based on characteristics of event cameras or other parameters of the system to account for local requirements or local circumstances.

In some embodiments, this may happen on one or both event cameras where the first crossing point was measured. Note, in some cases, it may be not sufficient to have a second point where one of $t_f$ and $t_s$ may be within the time $t_{tol}$ of the same parameter but instead, to be ambiguous, the second point may have both parameters $t_f$ and $t_s$ within the tolerance time. In practice, for some embodiments, with just two or a few more beams simultaneously captured on the scene, time collisions such as this where a crossing point may not be uniquely determined may be rare. In some embodiments, as the number of beams scanned across a scene increases, the probability that two or more crossing points with close enough first and second timestamps may increase, but it may remain uncommon. In some embodiments, if a crossing point on two or more event cameras may be unambiguously matched among the event cameras, the two trajectories that created the crossing points may also be matched. Also, in some embodiments, in a system with three or more event cameras, if each event camera has a crossing point with unambiguous of $t_f$ and $t_s$, then the trajectories may be matched on all event cameras; if the crossing points may be unambiguous on a subset of the event cameras, the trajectories may be matched for the subset, and other crossing points from each of those trajectories may be used to ascertain which crossing points to choose on the other event cameras. In some embodiments, trajectories that have been definitively matched on all event cameras may be eliminated from the list.

In step 960, in one or more of the various embodiments, if there may be remaining ambiguities on crossing points, sensing engines may be arranged to expand the graph of connected points to find less ambiguous graphs. In an embodiment, sensing engines may be arranged to generate one or more connection graphs that may represent one or more crossing points among trajectories for some or all event cameras in sensing systems.

Figure 10A:
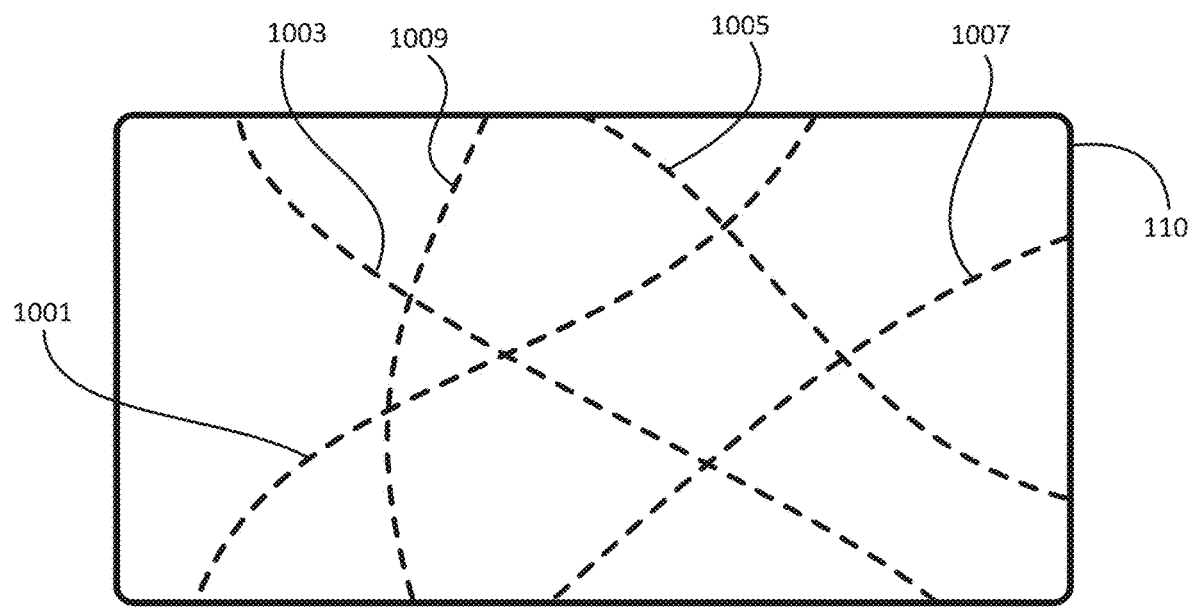
FIG. 10A shows an object with a exemplar trajectories traced over the surface of an object in accordance with one or more of the various embodiments.

FIG. 10A shows an object with a few trajectories traced over the surface of an object 810 in accordance with one or more of the various embodiments. In this example, the trajectories in FIG. 10A may be created by five separate beams scanning the surface at the same or different times, or alternatively trajectories could be created by fewer beams (as few as one) scanning at different times. In some cases, the times may overlap, or they may be non-overlapping. In this example, for some embodiments, the crossing points between the various trajectories may be represented as a simplified graph.

Figures 10B, 10C:
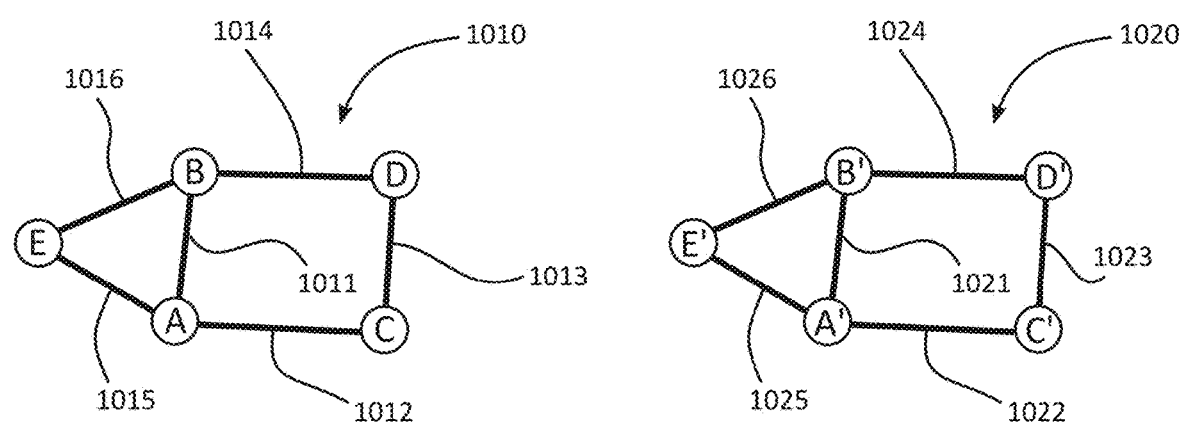
FIG. 10B shows a connection graph that corresponds to the trajectories in FIG. 10A in accordance with one or more of the various embodiments.
FIG. 10C shows another connection graph as seen from a different camera in accordance with one or more of the various embodiments.

FIG. 10B shows a connection graph 1010 corresponding to the trajectories in FIG. 10A in accordance with one or more of the various embodiments. In the connection graph 1010, complete trajectories as seen on an event sensor or event camera may be represented by circular nodes labeled with a letter. In this example, nodes labeled A, B, C, D, and E may represent trajectory 1001, trajectory 1003, trajectory 1005, trajectory 1007, and trajectory 1009 respectively. In these examples, if a crossing point between those two trajectories may be found, a thick line may be used to represent the edges that represent the relationship between those nodes. For instance, the crossing point between trajectory 1001 and trajectory 1003, also stated as crossing AB, may be represented by line 1011. Other crossing points may be similarly represented. Note that the positioning of the nodes and lines in the diagram may be considered to represent topological relationships/connections between the nodes rather than representing the geometric positioning of the trajectories either on the object or as measured at an event camera image sensor.

In one or more of the various embodiments, a connection graph, such as, connection graph 1010 may represent trajectories and crossings as seen at one event camera such as event camera 801.

FIG. 10C shows a different connection graph 1020 as seen from a different event camera such as event camera 803 in accordance with one or more of the various embodiments. In some embodiments, if all the same trajectories seen by event camera 801 and graphed in FIG. 10B may also be seen in the second event camera, event camera 803, the connection graph may be determined to be topologically the same.

In this example, for some embodiments, node A' represents trajectory 1001 as imaged on the second event camera, which may be the same as node A imaging trajectory 1001 on event camera 801. Similarly B=B', C=C', and so forth. Connection line 1021 or crossing A'B' also represents the crossing point of trajectories 1001 and 1003. As stated previously, the crossing points at each event camera may have a set of parameters (x, y, $t_f$, $t_s$). For crossing points seen at multiple event cameras, though the (x, y) coordinates may be different as they may be in each event camera's own image coordinate space, the ($t_f$, $t_s$) parameters should be substantially the same. So, crossing AB on a first event camera might look like ($x_1$, $y_1$, $t_f$, $t_s$), and crossing A'B' on a second event camera might look like ($x_2$, $y_2$, $t_f$, $t_s$). In a variant, these crossing points may be denoted by the crossing times of each path rather than ordering them in time, Thus, in some embodiments, crossing AB may also be listed with parameters ($x_1$, $y_1$, $t_A$, $t_B$) where $t_A$ may be the time when trajectory A crosses trajectory B, and crossing A'B' listed as ($x_1$, $y_1$, $t_{A'}$, $t_{B'}$). In some embodiments, this also contains the same information as before since generally $t_A$=$t_{A'}$ and $t_B$=$t_{B'}$ within a configured/defined tolerance range.

In one or more of the various embodiments, the connection graphs as shown may be likely a subset of the full graph available as there may be many more trajectories that could be chosen to show crossings and connectivity. In some embodiments, if a complete set of trajectories within a time window may be compared between two or more event cameras shows that a particular crossing point had unambiguous times ($t_f$, $t_s$), as previously described, the connection graph might not have to be used. In this example, for some embodiments, if the times for crossing AB and A'B' may be unique and unambiguous, trajectory A may be matched with A', and B with B'. However, in some embodiments, if the crossing point times may be duplicated in some other part of the scene by other trajectories such that the crossing point may be ambiguous on one or more of the event cameras, the graph may be expanded to use other connected trajectories. In an expansion, if crossing AB may be ambiguous, other trajectories crossing A and B may be examined. Node A may be connected to node C, and node B may be connected to node D. If it may be found that crossings AC and A'C' have unambiguous ($t_f$, $t_s$) parameters, A may be matched with A' and C with C'. Similarly, B could be matched with B' and D with D' if crossing BD and B'D' time parameters may be also unambiguous. In some cases, other connected crossing points may also have some ambiguity, so the graph may be expanded further.

For example, consider the connection graph 1010. Each connection line represents a specific ($t_f$, $t_s$) pair between two trajectories, and in this case one may see six unique pairs of time parameters. If even one of these time pairs may be unambiguous, two of the trajectories on each event camera may be matched together; following this, the other trajectories connected by edges in the graph may also be assigned. However, even in the worst case where all six time parameter ($t_f$, $t_s$) pairs in the graph may be considered ambiguous with other crossing points around the scene, the connection graph may still be used to uniquely identify and match trajectories, since other crossing points elsewhere in the scene may be not likely to be connected to the same nodes as in the graph here. In some embodiments, searching the connection graph from one event camera for matching with another event camera may be made more efficient by treating connection graphs as directed graphs.

Accordingly, in some embodiments, each connection line may represent a crossing point where one trajectory crosses a point on an object earlier than another. For instance, for crossing AB 1011, if $t_A$<$t_B$, then crossing point 1011 could also be represented as an arrow pointing from A to B. Doing this for all connection lines would appear to be a directed graph. In some embodiments, trajectories may be chosen to create a connection graph for an event camera where there may be no time overlap between the events of all of the trajectories. In this case, the directed graph may also be a directed acyclic graph (DAG), which may be traversed and searched quickly. In many cases, even if crossing trajectories may not be selected to remove overlaps, the graph or large subsets of the graph may also be a DAG.

As a simpler example, for some embodiments, FIG. 10D shows a larger graph set 1030 also containing a subgraph consisting of nodes A, B, E, which may otherwise be matched to nodes A', B', and E' on another event camera, except that all three crossing time pairs may be ambiguous to other time pairs with substantially the same times. In some embodiments, it may be that these other crossing points may be unconnected to one another. In this example, crossing AB at $(t_A, t_B)$ might be equal within a $t_{tol}$ to crossing JK at $(t_J, t_K)$ where substantially $t_A=t_J$ and $t_B=t_K$ on at least one of the event cameras. There may also be other crossings LM and NO that correspond to crossings AE and BE. But in some cases, none or few of the other crossing points that make those of A, B, and E ambiguous may be connected to one another, thus the unique connection graph allows one to make the assignments of matches between the event cameras. In the extremely unlikely event that these ambiguous other nodes may be connected to each other (this could happen if J and L may be the same node, K and N may be the same, and M and O may be the same node), then one may expand the connection graphs one further node to disambiguate the system. For instance, node D connected to A might not exist on the other subgraph, and so all connected nodes may be identified.

In some embodiments, connection graphs may be robust or resistant to noisy data as well. In some cases, full trajectories may be measured on one event camera but parts of the same trajectory may be assigned to one track on another event camera because of missed events or other noise. Occasionally a trajectory that may be visible from one event camera may be occluded by a different object in another event camera so may not be measured. In some cases, the trajectories may be seen but crossing points may not be assigned or calculated with a high degree of confidence. In these cases, edges or nodes may be missing on one connection graph that may be present in the first. FIG. 10E shows an example of this, where connection graph 1040 may be otherwise the same as graph 1020 but with one missing nodes (and associated crossing point lines) along with crossing point B'E'. Although trajectory C may not be matched with the event camera that created graph 1040, all of the other trajectories may be matched with a high degree of certainty based on the remaining connections.

In one embodiment, crossing point connection graphs may be used even if points may be otherwise seen to be unambiguous on a plurality of event cameras. To unambiguously assign a match at a crossing point, all possible matches to that crossing point need to be determined among the various trajectories in the time window. If a connection graph similar to FIG. 10B and FIG. 10C may be found on multiple event cameras, then those groups of trajectories may be very likely to match regardless of individual ambiguities in crossing point times. Having multiple connected nodes to a particular trajectory node may increase confidence in matching.

Also, in some cases, for some embodiments, a connection graph in common with most or all of the system event cameras may be found. Accordingly, in some embodiments, this connection graph on each event camera may be a subgraph of all the possible connections between trajectory nodes and may be used as a starting subgraph to search for other matches on connected nodes. For example, using as an illustration connection graphs 1010 and 1020, five trajectories may be matched between the two event cameras that measured all the trajectories. Since these trajectories may be now known on each event camera, they may each be used to find more connections to identify. The size of the starting subgraph may be not meant to be limiting. In some cases, single crossing points with two identified and matched trajectories may be sufficient to expand the connection graph search.

For example, FIG. 10F shows connection graph 1050 which may be similar to connection graph 1010 but with additional nodes added with crossing point connections to nodes A and C. In some cases, for some embodiments, the search space for finding these connections may be smaller than that to categorize every possible connection within a larger time window, because one needs to find trajectories that intersect the path of A at some point in time, and this may be checked over an arbitrarily time window to configured/defined to limit the size of the search. In this example, paths F and G were found to intersect with A and C. The same process may be done with trajectories on connection graph 1020, in this example finding crossings over the path of A' and C' instead. Then the crossing point time parameters $(t_f, t_s)$ may be compared from one list to the next and further matches may be made to extend the graph at each event camera. In this process, one may be less concerned with checking against other unconnected crossing points with similar time parameters because they have different connectivity to the nodes and thus would not be eligible for matching. The time window used for finding crossing points in this embodiment may be somewhat arbitrary, as crossing points may be determined with a reasonably large time difference between the trajectories. For instance, a large crossing graph may be generated based on crossings of trajectory node A, and then switch to checking crossing points of trajectory node B to expand the graph. If there may be missing or noisy data on one or all of the event cameras, other nodes may be chosen to find other connection points to improve the certainty of the matching.

In step 970 of process 900, in one or more of the various embodiments, if unmatched trajectories may remain, process 900 may loop back step 940 to check for additional possible matches; otherwise, the unmatched trajectories may be discarded or otherwise disregarded.

In one or more embodiments, step 920 may be deferred or determined later. In some cases, in a configured/defined time window, a number of crossings on each event camera may be used to generate a graph. Absent time synchronization, it may be difficult to determine which nodes on one event camera may match with any of the others. However, within a graph, the time offsets between the crossing points should remain constant even across event cameras. For example, if a crossing subgraph from event camera 801 has ten nodes with a number of crossing point lines, a similar subgraph from event camera 803 should have crossing point time parameters that have the same relative difference between them all. The time offset that corrects this may be the time base difference between the event cameras. This may be found by simple observation, or else by cross-correlation of the various crossing point times.

Also, in some embodiments, sensing engines may be arranged to employ graph crossings to improve the accuracy of matching trajectories measured on a calibrated event camera system. In a calibrated system, in some embodiments, it may be a necessary but insufficient condition that points from a trajectory measured on one event camera may satisfy the epipolar constraint if measured on another event camera. If matching trajectories where three or more event cameras may all see a trajectory, almost 100% of the trajectories may be matched in all the event cameras, but in areas where two event cameras may see a part of the scene, those two trajectories may be matched with 80-90% accuracy using epipolar constraints alone. However, if crossing points may be calculated for trajectories where the matching may be ambiguous, most of the rest of the trajectories could be matched with even minimal sized connection graphs. If ambiguities remain, the graph may be expanded as described herein.

It will be understood that each block (or step) in each flowchart illustration, and combinations of blocks in each flowchart illustration, may be implemented by computer program instructions. These program instructions may be provided to a processor to produce a machine, such that the instructions, which execute on the processor, create means for implementing the actions specified in each flowchart block or blocks. The computer program instructions may be executed by a processor to cause a series of operational steps to be performed by the processor to produce a computer-implemented process such that the instructions, which execute on the processor, provide steps for implementing the actions specified in each flowchart block or blocks. The computer program instructions may also cause at least some of the operational steps shown in the blocks of each flowchart to be performed in parallel. Moreover, some of the steps may also be performed across more than one processor, such as might arise in a multi-processor computer system. In addition, one or more blocks or combinations of blocks in each flowchart illustration may also be performed concurrently with other blocks or combinations of blocks, or even in a different sequence than illustrated without departing from the scope or spirit of the invention.

Accordingly, each block (or step) in each flowchart illustration supports combinations of means for performing the specified actions, combinations of steps for performing the specified actions and program instruction means for performing the specified actions. It will also be understood that each block in each flowchart illustration, and combinations of blocks in each flowchart illustration, may be implemented by special purpose hardware based systems, which perform the specified actions or steps, or combinations of special purpose hardware and computer instructions. The foregoing example should not be construed as limiting or exhaustive, but rather, an illustrative use case to show an implementation of at least one of the various embodiments of the invention.

Further, in one or more embodiments (not shown in the figures), the logic in the illustrative flowcharts may be executed using an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. In one or more embodiments, a microcontroller may be arranged to directly execute its own embedded logic to perform actions and access its own internal memory and its own external Input and Output Interfaces (e.g., hardware pins or wireless transceivers) to perform actions, such as System On a Chip (SOC), or the like.

Further, in some cases, for brevity or clarity, signal generators are referred to above as lasers, scanning lasers, or the like. Accordingly, one of ordinary skill in the art will appreciate that such specific references may be considered to be signal generators. Likewise, in some cases, sensors, event sensors, image sensors, or the like, may be referred to as cameras, event cameras, image cameras, frame capture cameras, or the like. Accordingly, one of ordinary skill in the art will appreciate that such specific references may be considered to be sensors, event sensors, image sensors, or the like.

What is claimed as new and desired to be protected by Letters Patent of the United States is:

1. A method for sensing objects using one or more processors that are configured to execute instructions, wherein the method performs actions, comprising:
    employing two or more signal beams to scan a plurality of paths across an object, wherein two or more sensors separately detect signals from the two or more signal beams reflected by the object;
    generating a plurality of trajectories based on the separately detected signals, wherein each trajectory is associated with one or more events that correspond to the separately detected signals;
    determining one or more crossing points based on a portion of the plurality of trajectories that intersect each other during the scan of the object, wherein one or more unambiguous crossing points associated with one or more candidate trajectories that are in common with each other are obtained based on an absence of other crossing points occurring within a time range tolerance value;
    generating one or more graphs based on the portion of trajectories and the one or more crossing points, wherein each edge in the one or more graphs corresponds to a crossing point, and wherein each node in the one or more graphs corresponds to a trajectory;
    comparing the one or more graphs to determine one or more matched graphs that share a common topology;
    determining one or more common trajectories based on the one or more matched graphs, wherein each common trajectory is associated with a same path across the object and a separate sensor; and
    determining one or more features of the object based on the one or more common trajectories.

2. The method of claim 1, wherein determining the one or more common trajectories, further comprises:
    determining a subset of the plurality of trajectories based on one or more characteristics of the plurality of trajectories, wherein the one or more characteristics include one or more of a trajectory geometry or a trajectory position; and
    excluding the determined subset of the plurality of trajectories from the determination of the one or more common trajectories.

3. The method of claim 1, wherein determining the one or more crossing points, further comprises:
    providing a first trajectory and a second trajectory from the plurality trajectories;
    determining a spatial coordinate value that corresponds to a location on the object based on the first and second trajectories;
    determining a first timestamp that corresponds to a time the first trajectory intersects the location;
    determining a second timestamp that corresponds to a time the second trajectory intersects the location; and
    determining a crossing point based on the spatial coordinate value and the first timestamp and the second timestamp.

4. The method of claim 1, further comprising:
    in response to determining a number of unmatched graphs that exceeds a threshold value, performing further actions, including:

expanding the one or more graphs to include one or more additional nodes and one or more additional edges based on including one or more additional trajectories and one or more additional crossing points; and determining one or more additional matched graphs based on a comparison of the one or more expanded graphs.

5. The method of claim 1, wherein the sensing system further comprises:

generating the two or more signal beams based on light emitted by one or more lasers.

6. The method of claim 1, wherein the two or more sensors include one or more of an event sensor or an image sensor.

7. The method of claim 1, wherein determining the one or more features of the object based on the one or more common trajectories, further comprises, determining one or more of a position, an orientation, a motion, or a deformation of the object.

8. A system for sensing objects:

a network computer, comprising:
a memory that stores at least instructions; and
one or more processors that are configured to execute instructions, wherein the instructions perform actions, including:
employing two or more signal beams to scan a plurality of paths across an object, wherein two or more sensors separately detect signals from the two or more signal beams reflected by the object;
generating a plurality of trajectories based on the separately detected signals, wherein each trajectory is associated with one or more events that correspond to the separately detected signals;
determining one or more crossing points based on a portion of the plurality of trajectories that intersect each other during the scan of the object, wherein one or more unambiguous crossing points associated with one or more candidate trajectories that are in common with each other are obtained based on an absence of other crossing points occurring within a time range tolerance value;
generating one or more graphs based on the portion of trajectories and the one or more crossing points, wherein each edge in the one or more graphs corresponds to a crossing point, and wherein each node in the one or more graphs corresponds to a trajectory;
comparing the one or more graphs to determine one or more matched graphs that share a common topology;
determining one or more common trajectories based on the one or more matched graphs; and
determining one or more features of the object based on the one or more common trajectories; and one or more client computers, comprising:
a memory that stores at least instructions; and
one or more processors configured to execute instructions, wherein the instructions perform actions, including, providing the two or more signal beams to scan the plurality of paths across the object.

9. The system of claim 8, wherein determining the one or more common trajectories, further comprises:

determining a subset of the plurality of trajectories based on one or more characteristics of the plurality of trajectories, wherein the one or more characteristics include one or more of a trajectory geometry or a trajectory position; and excluding the determined subset of the plurality of trajectories from the determination of the one or more common trajectories.

10. The system of claim 8, wherein determining the one or more crossing points, further comprises:

providing a first trajectory and a second trajectory from the plurality trajectories;

determining a spatial coordinate value that corresponds to a location on the object based on the first and second trajectories;

determining a first timestamp that corresponds to a time the first trajectory intersects the location;

determining a second timestamp that corresponds to a time the second trajectory intersects the location; and determining a crossing point based on the spatial coordinate value and the first timestamp and the second timestamp.

11. The system of claim 8, wherein the one or more processors of the network computer are configured to execute instructions, wherein the instructions perform actions further comprising:

in response to determining a number of unmatched graphs that exceeds a threshold value, performing further actions, including:
expanding the one or more graphs to include one or more additional nodes and one or more additional edges based on including one or more additional trajectories and one or more additional crossing points; and
determining one or more additional matched graphs based on a comparison of the one or more expanded graphs.

12. The system of claim 8, wherein the sensing system further comprises:

generating the two or more signal beams based on light emitted by one or more lasers.

13. The system of claim 8, wherein the two or more sensors include one or more of an event sensor or an image sensor.

14. The system of claim 8, wherein determining the one or more features of the object based on the one or more common trajectories, further comprises, determining one or more of a position, an orientation, a motion, or a deformation of the object.

15. A network computer for sensing objects, comprising:

a memory that stores at least instructions; and
one or more processors configured to execute instructions, wherein the instructions perform actions, including:
employing two or more signal beams to scan a plurality of paths across an object, wherein two or more sensors separately detect signals from the two or more signal beams reflected by the object;
generating a plurality of trajectories based on the separately detected signals, wherein each trajectory is associated with one or more events that correspond to the separately detected signals;
determining one or more crossing points based on a portion of the plurality of trajectories that intersect each other during the scan of the object, wherein one or more unambiguous crossing points associated with one or more candidate trajectories that are in common with each other are obtained based on an absence of other crossing points occurring within a time range tolerance value;
generating one or more graphs based on the portion of trajectories and the one or more crossing points, wherein each edge in the one or more graphs corresponds to a crossing point, and wherein each node in the one or more graphs corresponds to a trajectory;
comparing the one or more graphs to determine one or more matched graphs that share a common topology;
determining one or more common trajectories based on the one or more matched graphs, wherein each common trajectory is associated with a same path across the object and a separate sensor; and
determining one or more features of the object based on the one or more common trajectories.

16. The network computer of claim 15, wherein determining the one or more common trajectories, further comprises:
determining a subset of the plurality of trajectories based on one or more characteristics of the plurality of trajectories, wherein the one or more characteristics include one or more of a trajectory geometry or a trajectory position; and
excluding the determined subset of the plurality of trajectories from the determination of the one or more common trajectories.

17. The network computer of claim 15, wherein determining the one or more crossing points, further comprises:
providing a first trajectory and a second trajectory from the plurality trajectories;
determining a spatial coordinate value that corresponds to a location on the object based on the first and second trajectories;
determining a first timestamp that corresponds to a time the first trajectory intersects the location;
determining a second timestamp that corresponds to a time the second trajectory intersects the location; and
determining a crossing point based on the spatial coordinate value and the first timestamp and the second timestamp.

18. The network computer of claim 15, wherein the one or more processors are configured to execute instructions, wherein the instructions perform actions further comprising:
in response to determining a number of unmatched graphs that exceeds a threshold value, performing further actions, including:
expanding the one or more graphs to include one or more additional nodes and one or more additional edges based on including one or more additional trajectories and one or more additional crossing points; and
determining one or more additional matched graphs based on a comparison of the one or more expanded graphs.

19. The network computer of claim 15, wherein the sensing system further comprises:
generating the two or more signal beams based on light emitted by one or more lasers.

20. The network computer of claim 15, wherein the two or more sensors include one or more of an event sensor or an image sensor.

21. The network computer of claim 15, wherein determining the one or more features of the object based on the one or more common trajectories, further comprises, determining one or more of a position, an orientation, a motion, or a deformation of the object.

22. A processor readable non-transitory storage media that includes instructions for sensing objects, wherein execution of the instructions by one or more processors on one or more network computers performs actions, comprising:
employing two or more signal beams to scan a plurality of paths across an object, wherein two or more sensors separately detect signals from the two or more signal beams reflected by the object;
generating a plurality of trajectories based on the separately detected signals, wherein each trajectory is associated with one or more events that correspond to the separately detected signals;
determining one or more crossing points based on a portion of the plurality of trajectories that intersect each other during the scan of the object, wherein one or more unambiguous crossing points associated with one or more candidate trajectories that are in common with each other are obtained based on an absence of other crossing points occurring within a time range tolerance value;
generating one or more graphs based on the portion of trajectories and the one or more crossing points, wherein each edge in the one or more graphs corresponds to a crossing point, and wherein each node in the one or more graphs corresponds to a trajectory;
comparing the one or more graphs to determine one or more matched graphs that share a common topology;
determining one or more common trajectories based on the one or more matched graphs, wherein each common trajectory is associated with a same path across the object and a separate sensor; and
determining one or more features of the object based on the one or more common trajectories.

23. The media of claim 22, wherein determining the one or more common trajectories, further comprises:
determining a subset of the plurality of trajectories based on one or more characteristics of the plurality of trajectories, wherein the one or more characteristics include one or more of a trajectory geometry or a trajectory position; and
excluding the determined subset of the plurality of trajectories from the determination of the one or more common trajectories.

24. The media of claim 22, wherein determining the one or more crossing points, further comprises:
providing a first trajectory and a second trajectory from the plurality trajectories;
determining a spatial coordinate value that corresponds to a location on the object based on the first and second trajectories;
determining a first timestamp that corresponds to a time the first trajectory intersects the location;
determining a second timestamp that corresponds to a time the second trajectory intersects the location; and
determining a crossing point based on the spatial coordinate value and the first timestamp and the second timestamp.

25. The media of claim 22, further comprising:
in response to determining a number of unmatched graphs that exceeds a threshold value, performing further actions, including:
expanding the one or more graphs to include one or more additional nodes and one or more additional edges based on including one or more additional trajectories and one or more additional crossing points; and
determining one or more additional matched graphs based on a comparison of the one or more expanded graphs.

26. The media of claim 22, wherein the sensing system further comprises:
generating the two or more signal beams based on light emitted by one or more lasers.

27. The media of claim 22, wherein the two or more sensors include one or more of an event sensor or an image sensor.

28. The media of claim 22, wherein determining the one or more features of the object based on the one or more common trajectories, further comprises, determining one or more of a position, an orientation, a motion, or a deformation of the object.

* * * * *